United States Patent
Nishimoto et al.

(10) Patent No.: US 12,214,789 B2
(45) Date of Patent: Feb. 4, 2025

(54) DRIVING SUPPORT DEVICE FOR VEHICLE, DRIVING SUPPORT METHOD FOR VEHICLE, AND A NON-TRANSITORY COMPUTER-READABLE STORAGE MEDIUM STORING A PROGRAM FOR CAUSING A COMPUTER

(71) Applicant: TOYOTA JIDOSHA KABUSHIKI KAISHA, Toyota (JP)

(72) Inventors: Tatsuya Nishimoto, Susono (JP); Yuta Ikezawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 17/980,251

(22) Filed: Nov. 3, 2022

(65) Prior Publication Data
US 2023/0141328 A1 May 11, 2023

(30) Foreign Application Priority Data
Nov. 5, 2021 (JP) .................. 2021-181078

(51) Int. Cl.
*B60W 30/18* (2012.01)
*G06V 20/58* (2022.01)

(52) U.S. Cl.
CPC ..... *B60W 30/18159* (2020.02); *G06V 20/584* (2022.01); *B60W 2420/403* (2013.01);
(Continued)

(58) Field of Classification Search
CPC ..... B60W 30/18159; B60W 2420/403; B60W 2520/10; B60W 2540/20; B60W 2552/05; B60W 2554/802; B60W 2555/60; B60W 30/143; B60W 2720/106; B60W 30/18154; G06V 20/584
See application file for complete search history.

(56) References Cited

U.S. PATENT DOCUMENTS 8,355,851 B2   1/2013 Inoue et al.
8,370,040 B2   2/2013 Inoue et al.
(Continued)

FOREIGN PATENT DOCUMENTS

JP   2009149123 A  *  7/2009
JP   2011016494 A  *  1/2011
(Continued)

*Primary Examiner* — Rami Khatib
(74) *Attorney, Agent, or Firm* — Sughrue Mion, PLLC

(57) ABSTRACT

A driving support ECU (21) of a driving support device (11a) executes automatic deceleration control for decelerating a vehicle (10) without a driver operating a brake pedal (105) when it is determined that a specific condition indicating that the driver intends to turn the vehicle (10) to the right or left at an intersection present in front of the vehicle (10) is satisfied. When a direction indicator (34, 35) stops operating during execution of the automatic deceleration control, the driving support ECU (21) continues the automatic deceleration control until a predetermined time period elapses from a time point at which the direction indicator (34, 35) stops operating, and ends the automatic deceleration control when the direction indicator (34, 35) continues to stop operating from when the direction indicator (34, 35) stops operating until the predetermined time period elapses.

3 Claims, 11 Drawing Sheets

(52) U.S. Cl.
CPC ..... *B60W 2520/10* (2013.01); *B60W 2540/20* (2013.01); *B60W 2552/05* (2020.02); *B60W 2554/802* (2020.02); *B60W 2555/60* (2020.02)

(56) References Cited

U.S. PATENT DOCUMENTS

| | | |
|---|---|---|
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 2019/0206258 A1* | 7/2019 | Chang .................. G06T 19/006 |
| 2019/0295419 A1 | 9/2019 | Tosa et al. |
| 2020/0001875 A1* | 1/2020 | Kato .................. G01C 21/3602 |
| 2022/0063669 A1* | 3/2022 | Fukushige ............ B60W 40/08 |
| 2024/0208501 A1* | 6/2024 | Kitahara ......... B60W 30/18154 |

FOREIGN PATENT DOCUMENTS

| | | | |
|---|---|---|---|
| JP | 6238586 B2 | * | 11/2017 |
| JP | 2020-004333 A | | 1/2020 |

* cited by examiner

DRIVING SUPPORT DEVICE FOR VEHICLE, DRIVING SUPPORT METHOD FOR VEHICLE, AND A NON-TRANSITORY COMPUTER-READABLE STORAGE MEDIUM STORING A PROGRAM FOR CAUSING A COMPUTER

BACKGROUND OF THE INVENTION

1. Field of the Invention

The present invention relates to a driving support device for a vehicle, a driving support method for a vehicle, and a non-transitory computer-readable storage medium storing A program for causing a computer.

2. Description of the Related Art

Hitherto, there has been known a driving support device which executes deceleration control of a vehicle when a driver performs, for example, an operation based on an intention of turning a vehicle to the right or left, such as activating a direction indicator. For example, in Japanese Patent Application Laid-open No. 2020-4333, there is disclosed a driving support device which executes braking control or steering control of a vehicle when a direction indicator is operating, or when the direction indicator is not operating but there has been a response by the driver that the driver is going to turn the vehicle to the right or left.

Incidentally, after the driver operates a turn signal lever to start the operation of the direction indicator, the direction indicator may stop operating before the vehicle reaches an intersection. For example, when the driver intends to turn the vehicle to the right at an intersection, the driver operates the turn signal lever to start the operation of the direction indicator (right direction indicator) indicating that the vehicle is to turn right, then rotates a steering wheel to the right in order to change a lane of the vehicle to a right turn lane, and then rotates the steering wheel to the left to drive the vehicle along the right turn lane. At this time, when the amount of rotation of the steering to the left is large, the right direction indicator may stop operating. In such a case, the driver intends to turn the vehicle to the right, and hence it is required that deceleration control of the vehicle be continued. Meanwhile, when the right turn of the vehicle is to be ended and the vehicle is to be driven in a straight direction, the driver operates the turn signal lever to stop the operation of the right direction indicator. In such a case, the driver does not intend to turn the vehicle to the right, and hence it is required to end the deceleration control of the vehicle.

However, in a related-art driving support device, when operation of the direction indicator starts but then stops before the vehicle reaches the intersection, it may not be possible to determine whether or not the driver no longer intends to turn the vehicle to the right or left (in other words, whether or not the stopping of the operation of the direction indicator is an erroneous operation). In deceleration control which ends the deceleration of the vehicle when the operation of the direction indicator stops, even though the driver intends to turn the vehicle to the right or left (in other words, even though the driver expects the vehicle to continue decelerating), the deceleration of the vehicle may be ended contrary to that intention. It should be noted that, in Japanese Patent Application Laid-open No. 2020-4333, control in a case in which the direction indicator starts to operate but then stops operating before the vehicle reaches the intersection is not disclosed.

SUMMARY OF THE INVENTION

The present invention has been made in order to address the above-mentioned problems. That is, one object of the present invention to provide a driving support device for a vehicle, a driving support method for a vehicle, and a program which prevent or suppress deceleration control of the vehicle from ending even though a driver intends to turn the vehicle to the right or left at an intersection.

In order to solve the above-mentioned problems, according to at least one embodiment of the present invention, there is provided a driving support device (11a, 11b) for a vehicle, the driving support device (11a, 11b) including a control device (21) configured to: execute automatic deceleration control for decelerating the vehicle (10) when a specific condition indicating that a driver of the vehicle (10) intends to turn the vehicle (10) to right or left at an intersection present in front of the vehicle (10) is satisfied, the specific condition including operation of a direction indicator (34, 35) for indicating a travel direction of the vehicle (10) as a condition of satisfaction; continue, when the direction indicator (34, 35) stops operating during execution of the automatic deceleration control, the automatic deceleration control for a predetermined time period from a time point at which the direction indicator (34, 35) stops operating; and end the automatic deceleration control when the direction indicator (34, 35) continues to stop operating from the time point at which the direction indicator (34, 35) stops operating until the predetermined time period elapses.

According to the at least one embodiment of the present invention, when the direction indicator stops operating during execution of the automatic deceleration control, the control device does not immediately end the automatic deceleration control, but continues the automatic deceleration control for the predetermined time period after the direction indicator stops operating. This prevents or suppresses the automatic deceleration control from ending at a time point not intended by the driver when the direction indicator stops operating even though the driver intends to turn the vehicle to the right or left. In this case, the driver can continue the automatic deceleration control even after the predetermined time period elapses by performing an operation for satisfying the specific condition within the predetermined time period. Meanwhile, when the direction indicator continues to stop operating from the time point at which the direction indicator stops operating until the predetermined time period elapses, it can be considered that the driver does not intend to turn the vehicle to the right or left. As a result, in this case, the control device ends the automatic deceleration control at the time point when the predetermined time period has elapsed. Therefore, the automatic deceleration control can be ended in accordance with the intention of the driver.

The control device (21) may be configured to determine that the specific condition is satisfied when a distance from the vehicle (10) to the intersection present in front of the vehicle (10) is equal to or less than a predetermined distance, a required degree of acceleration is zero, and the direction indicator (34, 35) is operating.

When the driver intends to turn the vehicle to the right or left at an intersection, the driver activates a right direction indicator (direction indicator indicating that the vehicle is to turn right) or a left direction indicator (direction indicator indicating that the vehicle is to turn left). Further, when the driver intends to turn the vehicle to the right or left at an intersection, the driver reduces the operation amount of the accelerator pedal to zero in order to decelerate the vehicle. As a result, the degree of acceleration (required degree of acceleration) required by the driver becomes zero. The required degree of acceleration is the degree of acceleration of the vehicle, which is determined in accordance with the operation amount, for example, of the accelerator pedal by the driver. Through use of the fact that the required degree of acceleration is zero and the direction indicator is operating in the determination of whether or not the specific condition is satisfied, it is possible to determine whether the driver intends to turn the vehicle to the right or left. Further, when the required degree of acceleration is not zero, the specific condition is not satisfied, and hence the automatic deceleration control is not executed. In this case, the acceleration or deceleration of the vehicle by the driver is prioritized, and the driver can accelerate or decelerate the vehicle as he or she intends.

The driving support device (11a, 11b) for a vehicle may further include: a front camera (36) configured to photograph a landscape in front of the vehicle (10); and a vehicle speed sensor (31) configured to detect a speed of the vehicle (10), and the control device (21) may be configured to: search for a traffic light present in front of the vehicle (10) by performing image processing on an image taken by the front camera (36), and calculate a distance from the vehicle (10) to the traffic light when the traffic light is detected by the search; and set the calculated distance from the vehicle (10) to the traffic light as the distance from the vehicle (10) to the intersection present in front of the vehicle (10).

The traffic light is positioned higher than the road surface, and hence the traffic light can be detected by the front camera from further away as compared with a stop line, for example, drawn on the road surface. Therefore, by detecting the distance from the vehicle to the intersection in front of the vehicle based on the detected distance to the traffic light, the intersections can be detected earlier than in a configuration in which the distance from the vehicle to the intersection in front of the vehicle is detected based on the image of a stop line, for example, drawn on the road surface. As a result, with such a configuration, the automatic deceleration control can be started at an earlier time point than in a configuration of searching for the intersection present in front of the vehicle by searching for a stop line, for example, drawn on the road surface. Therefore, the degree of deceleration of the vehicle in the automatic deceleration control can be reduced, and thus sudden deceleration of the vehicle can be prevented or suppressed. Further, the traffic light is positioned higher than the road surface, and hence, compared with a stop line, for example, drawn on the road surface, it is less likely that the traffic light is hidden by another vehicle, for example, and is not detectable. Therefore, the accuracy of determining the specific condition can be improved.

When the traffic light is no longer detected from the image taken by the front camera (36), the control device (21) may be configured to: calculate a distance from the vehicle (10) to the traffic light at a current time point based on a distance from the vehicle (10) to the traffic light calculated at a time point of last detection of the traffic light, a speed of the vehicle (10) at the time point of the last detection of the traffic light, and an elapsed time from the time point of the last detection of the traffic light; and set the calculated distance from the vehicle (10) to the traffic light as a distance from the vehicle (10) to the intersection present in front of the vehicle (10) at the current time point.

In a case in which another vehicle is traveling in front of the vehicle, when the vehicle and the another vehicle come close to each other, the traffic light may no longer be detected (may not be shown in the image of the front camera). According to the at least one embodiment of the present invention, even when a traffic light that had been detected once is subsequently no longer detected, the control device can calculate (estimate) the distance from the vehicle to the traffic light (distance from the vehicle to the intersection present in front of the vehicle) at the current time point. Therefore, the control device can continue to determine whether or not the specific condition is satisfied.

The vehicle may include: a turn signal lever (103) operatively configured to switch between a state in which the direction indicator (34, 35) is operating and a state in which the operation of the direction indicator (34, 35) is stopped in accordance with a position of the turn signal lever (103); and a steering wheel configured to stop the operation of the direction indicator (34, 35) when the steering wheel rotates in a direction opposite to the travel direction of the vehicle (10) indicated by the direction indicator (34, 35) during the operation, and the control device (21) may be configured to set the predetermined time period to be shorter when the direction indicator (34, 35) has stopped operating due to operation of the turn signal lever (103) during execution of the automatic deceleration control as compared with when the direction indicator has stopped operating due to the rotation of the steering wheel.

When the direction indicator has stopped operating due to the operation of the turn signal lever, there is a higher likelihood that the driver does not intend to turn the vehicle to the right or left as compared with when the direction indicator has stopped operating due to the rotation of the steering wheel. Meanwhile, the turn signal lever may be moved so as to stop the operation of the direction indicator against the intention of the driver (for example, by coming into contact with the hand of the driver). However, in this case, the driver is likely to immediately again operate the turn signal lever so that the direction indicator operates. Thus, even when the direction indicator stops operating due to the operation of the turn signal lever, the control device does not immediately end the automatic deceleration control, but continues the automatic deceleration control for the predetermined time period. As a result, it is possible to prevent or suppress the automatic deceleration control from ending at a time point not intended by the driver. Meanwhile, by setting the duration of this automatic deceleration control to be shorter than when the direction indicator has stopped operating due to the rotation of the steering wheel, the automatic deceleration control can be quickly ended when the driver does not intend to turn the vehicle to the right or left.

The control device (21) may be configured to end the automatic deceleration control when the position of the turn signal lever (103) is no longer detected during execution of the automatic deceleration control.

When the position of the turn signal lever (in other words, the operation of the turn signal lever) is not detectable by the control device, the control device cannot determine whether or not the specific condition is satisfied. Therefore, in this case, by ending the automatic deceleration control by the control device, it is possible to prevent or suppress the continued deceleration of the vehicle against the intention of the driver.

According to at least one embodiment of the present invention, there is provided a driving support method for a vehicle (10), the driving support method being executed by a driving support device (11a, 11b) for a vehicle (10), the driving support device (11a, 11b) including a direction indicator (34, 35) for indicating a travel direction of the vehicle (10), and being configured to decelerate the vehicle (10) without a driver operating a brake pedal, the driving support method including: executing automatic deceleration control for decelerating the vehicle (10) when a specific condition indicating that the driver of the vehicle (10) intends to turn the vehicle (10) to right or left at an intersection present in front of the vehicle (10) is satisfied, the specific condition including operation of the direction indicator (34, 35) as a condition of satisfaction; continuing, when the direction indicator (34, 35) stops operating during execution of the automatic deceleration control, the automatic deceleration control for a predetermined time period from a time point at which the direction indicator (34, 35) stops operating; and ending the automatic deceleration control when the direction indicator (34, 35) continues to stop operating from the time point at which the direction indicator (34, 35) stops operating until the predetermined time period elapses.

According to at least one embodiment of the present invention, there is provided a non-transitory computer-readable storage medium storing a program for causing a computer (21) of a driving support device (11a, 11b) for a vehicle (10), the driving support device (11a, 11b) for a vehicle (10) including a direction indicator (34, 35) for indicating a travel direction of the vehicle (10) and being configured to decelerate the vehicle (10) without a driver operating a brake pedal (105), to execute processing comprising: executing automatic deceleration control for decelerating the vehicle (10) when a specific condition indicating that the driver of the vehicle (10) intends to turn the vehicle (10) to right or left at an intersection present in front of the vehicle (10) is satisfied, the specific condition including operation of the direction indicator (34, 35) as a condition of satisfaction; continuing, when the direction indicator (34, 35) stops operating during execution of the automatic deceleration control, the automatic deceleration control for a predetermined time period from a time point at which the direction indicator (34, 35) stops operating; and ending the automatic deceleration control when the direction indicator (34, 35) continues to stop operating from the time point at which the direction indicator (34, 35) stops operating until the predetermined time period elapses.

In the above description, the terms and/or reference symbols used in embodiments described later are enclosed in parentheses and assigned to the components of the present invention corresponding to the embodiments for easier understanding of the present invention. However, the constituent elements of the present invention are not limited to the embodiments defined by the terms and/or reference symbols.

DESCRIPTION OF THE EMBODIMENTS

Embodiments of the present invention are now described with reference to the drawings. In the following description, a driving support device for a vehicle according to each embodiment of the present invention may be abbreviated as "support device." Further, as used herein, "degree of deceleration" refers to the magnitude of decrease in speed per unit time, and specifically, the magnitude (absolute value) of acceleration when the acceleration is a negative value.

First Embodiment (Configuration of Support Device)

Figure 1:
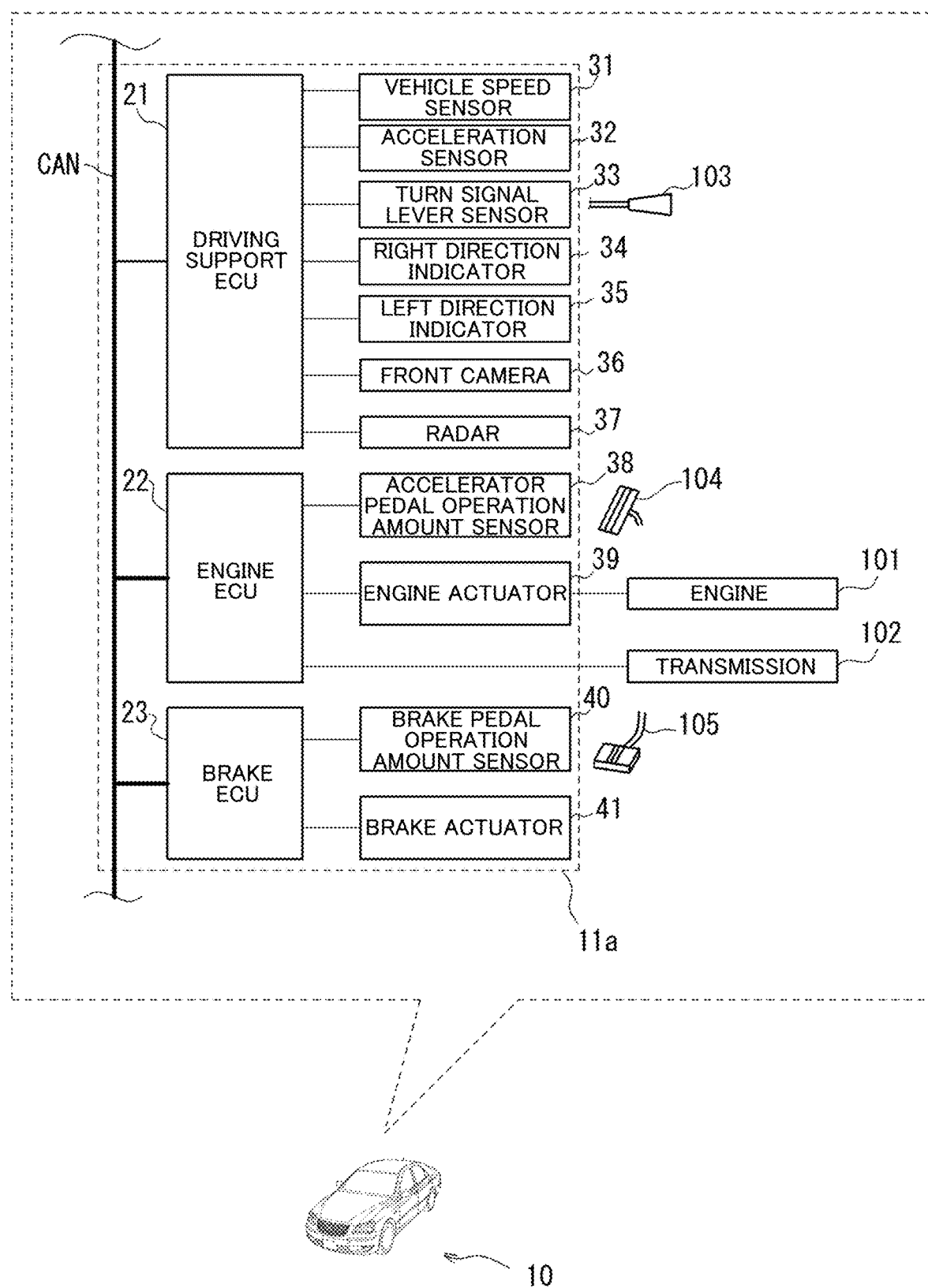
FIG. 1 is a diagram for illustrating a vehicle and a driving support device for a vehicle according to a first embodiment of the present invention.

FIG. 1 is a diagram for illustrating a vehicle 10 and a support device 11a mounted on the vehicle 10. As illustrated in FIG. 1, the vehicle 10 includes an engine 101, a transmission 102, a turn signal lever 103, an accelerator pedal 104, a brake pedal 105, a steering wheel (not shown), and the support device 11a. The engine 101 is a driving force source for the vehicle 10. The transmission 102 is a mechanism which adjusts the driving force of the engine 101 and transmits the driving force to drive wheels of the vehicle 10. The turn signal lever 103, the accelerator pedal 104, the brake pedal 105, and the steering wheel are operating members that can be operated by the driver. The support device 11a includes a driving support ECU 21, an engine ECU 22, a brake ECU 23, a vehicle speed sensor 31, an acceleration sensor 32, a turn signal lever sensor 33, a right direction indicator 34, a left direction indicator 35, a front camera 36, a radar 37, an accelerator pedal operation amount sensor 38, an engine actuator 39, a brake pedal operation amount sensor 40, and a brake actuator 41.

The left direction indicator 34 and the left direction indicator 35 are configured so as to operate in response to an operation of the turn signal lever 103 described later. The right direction indicator 34 and the left direction indicator 35 each include a light source, and are devices for indicating a travel direction of the vehicle 10 by operating (specifically, blinking of the light source). The right direction indicator 34 is a direction indicator operated when the driver intends to drive the vehicle 10 to the right side (when the driver intends to turn the vehicle 10 to the right or intends to change the lane of the vehicle 10 from the lane in which the vehicle 10 is currently traveling to the lane on the right side). The left direction indicator 35 is a direction indicator operated when the driver intends to drive the vehicle 10 to the left side (when the driver intends to turn the vehicle 10 to the left or intends to change the lane of the vehicle 10 from the lane in which the vehicle 10 is currently traveling to the lane on the left side). The right direction indicator 34 is arranged on the outside of a vehicle body on the right, and the left direction indicator 35 is arranged on the outside of the vehicle body on the left. The right direction indicator 34 and the left direction indicator 35 may be collectively referred to as "left and right direction indicators 34 and 35."

The turn signal lever 103 is configured to be movable between an OFF position in which the left and right direction indicators 34 and 35 are both not operated, a right ON position in which the right direction indicator 34 is operated, and a left ON position in which the left direction indicator 35 is operated. Further, the turn signal lever 103 is also configured such that when the turn signal lever 103 is positioned at the right ON position or the left ON position and the steering wheel is rotated in the direction opposite to the travel direction of the vehicle 10 indicated by one of the left and right direction indicators 34 and 35 that is operating, the turn signal lever 103 moves to the OFF position based on the movement of the steering wheel. Specifically, when the turn signal lever 103 is moved to the right ON position and the steering wheel is rotated to the left while the right direction indicator 34 is operating, the turn signal lever 103 is moved to the OFF position and the right direction indicator 34 stops operating. Moreover, when the turn signal lever 103 is moved to the left ON position and the steering wheel is rotated to the right while the left direction indicator 35 is operating, the turn signal lever 103 is moved to the OFF position and the left direction indicator 35 stops operating.

The driving support ECU 21, the engine ECU 22, and the brake ECU 23 are all electronic control devices each including a microcomputer as a main part. The microcomputer includes a CPU, a ROM, a RAM, a nonvolatile memory, and an interface I/F, for example. The CPU is configured to read out instructions (programs and routines) stored in the ROM, load the instructions onto the RAM, and execute the instructions, to thereby achieve various functions. The driving support ECU 21, the engine ECU 22, and the brake ECU 23 are connected so as to be capable of transmitting and receiving signals via a CAN. "ECU" is an abbreviation for "electronic control unit" and "CAN" is an abbreviation for "controller area network."

The driving support ECU 21 is configured to be capable of executing deceleration support control, which is described later. The vehicle speed sensor 31, the acceleration sensor 32, the turn signal lever sensor 33, the right direction indicator 34, the left direction indicator 35, the front camera 36, and the radar 37 are connected to the driving support ECU 21.

The vehicle speed sensor 31 detects the vehicle speed. The driving support ECU 21 continuously acquires detection results of a vehicle speed obtained by the vehicle speed sensor 31 at a predetermined cycle. The acceleration sensor 32 detects the degree of acceleration in a front-rear direction of the vehicle 10. The driving support ECU 21 continuously acquires detection results of the degree of acceleration in the front-rear direction of the vehicle 10 obtained by the acceleration sensor 32 at a predetermined cycle.

The turn signal lever sensor 33 detects the position of the turn signal lever 103 (OFF position, right ON position, left ON position). Electric switches can be used for the turn signal lever sensor 33. Specifically, the turn signal lever sensor 33 can be configured by combining a switch that is turned ON when the turn signal lever 103 is positioned at the right ON position and is turned OFF when the turn signal lever 103 is positioned at other positions, and a switch that is turned ON when the turn signal lever 103 is positioned at the left ON position and is turned off when the turn signal lever 103 is positioned at other positions. The driving support ECU 21 acquires a detection result of the position of the turn signal lever 103 obtained by the turn signal lever sensor 33. When the turn signal lever 103 is positioned at the OFF position, the driving support ECU 21 does not operate any of the left and right direction indicators 34 and 35. The driving support ECU 21 operates the right direction indicator 34 when the turn signal lever 103 is positioned at the right ON position, and operates the left direction indicator 35 when the turn signal lever 103 is positioned at the left ON position.

The front camera 36 is arranged, for example, in a substantially central portion of a front bumper in a vehicle width direction, and generates image data by photographing a landscape in front of the vehicle 10. The driving support ECU 21 can detect (recognize) objects present in front of the vehicle 10 (for example, a traffic light installed at an intersection in front of the vehicle 10) by performing image recognition processing on the image data generated by the front camera 36. The front camera 36 may be a monocular camera or a stereo camera.

The radar 37 detects objects present in front of the vehicle 10 and measures the distance from the vehicle 10 to each object. Examples of the objects include fixed obstacles such as a traffic light, a road sign, a guardrail, and a building, as well as moving obstacles such as a pedestrian, a bicycle, and another vehicle. For example, a millimeter wave radar is used for the radar 37. The millimeter wave radar transmits millimeter waves (electromagnetic waves having a frequency of from 30 G Hz to 300 GHz) in front of the vehicle 10 and receives the reflected waves. Then, the millimeter wave radar acquires the distance from the vehicle 10 to the object present in front of the vehicle 10 based on the transmitted waves and the reflected waves, and outputs the acquired distance to the driving support ECU 21. The driving support ECU 21 acquires the detection result of the object obtained by the radar 37. In addition, a LiDAR (light detection and ranging or laser imaging detection and ranging) sensor may be used for the radar 37 instead of a millimeter wave radar or in addition to the millimeter wave radar.

The accelerator pedal operation amount sensor 38, the engine actuator 39, and the transmission 102 are connected to the engine ECU 22. The engine actuator 39 includes a throttle valve actuator which changes an opening degree of a throttle valve of the engine 101. The accelerator pedal operation amount sensor 38 is configured to be capable of acquiring the operation amount of the accelerator pedal 104. The engine ECU 22 can change the driving force (torque) generated by the engine 101, which is the driving force source of the vehicle 10, by driving the engine actuator 39 in accordance with the operation amount of the accelerator pedal 104. The driving force generated by the engine 101 is transmitted to the drive wheels via the transmission 102. The engine ECU 22 controls the engine actuator 39 and the transmission 102 such that the driving force changing in accordance with the acquired operation amount of the accelerator pedal 104 is transmitted to the drive wheels of the vehicle 10. When the vehicle 10 is a hybrid vehicle, the engine ECU 22 can control the driving force generated by any one or both of "the engine 101 and an electric motor" serving as the driving force source of the vehicle 10. Further, when the vehicle 10 is an electric vehicle, the engine ECU 22 can control the driving force generated by the electric motor as the driving force source.

The brake ECU 23 is connected to the brake pedal operation amount sensor 40 and the brake actuator 41. The brake pedal operation amount sensor 40 is configured to detect the operation amount of the brake pedal 105. The driving support ECU 21 acquires the operation amount of the brake pedal 105 (in other words, information representing the magnitude of the vehicle braking force generated by a friction brake mechanism) obtained by the brake pedal operation amount sensor 40 via the brake ECU 23. The brake actuator 41 adjusts a hydraulic pressure (pressure of a master cylinder) of working oil of a friction brake mechanism arranged on each wheel, and applies a friction braking force corresponding to the hydraulic pressure to each of the wheels. The brake ECU 23 determines a required degree of deceleration, which is described later, based on the operation amount of the brake pedal 105 detected by the brake pedal operation amount sensor 40, and controls the brake actuator 41 such that the vehicle 10 decelerates at the required degree of deceleration. The vehicle 10 may include, in place of the brake pedal operation amount sensor 40 or in addition to the brake pedal operation amount sensor 40, a pressure sensor which detects the hydraulic pressure (pressure of the master cylinder) of the working oil of the friction brake mechanism. In this case, the driving support ECU 21 can acquire a detection result of the hydraulic pressure of the working oil obtained by the pressure sensor via the brake ECU 23 as information representing the magnitude of the vehicle braking force generated by the friction brake mechanism.

Further, when the brake ECU 23 receives an automatic deceleration control command from the driving support ECU 21, the brake ECU 23 controls the operation of the brake actuator 41 such that the vehicle 10 decelerates at the degree of deceleration included in the automatic deceleration control command. The automatic deceleration control command is a command for causing the driving support ECU 21 to decelerate the vehicle 10 without the driver operating the brake pedal 105. Specifically, the automatic deceleration control command is a signal including a target degree of acceleration (degree of deceleration) of the vehicle 10. In this way, when the brake ECU 23 receives an automatic deceleration control command from the driving support ECU 21, the brake ECU 23 can decelerate the vehicle 10 without requiring the driver to operate the brake pedal 105. That is, the support device 11a is configured to be capable of decelerating the vehicle 10 without the driver operating the brake pedal 105.

(Details of Deceleration Support Control)

Next, deceleration support control executed by the driving support ECU 21 of the support device 11a is described. The deceleration support control is an example of a driving support method of at least one embodiment of the present invention. The deceleration support control is "control of determining whether or not a condition that the driver can be assumed to intend to turn the vehicle 10 to the right or the left at an intersection present in the forward travel direction of the vehicle 10 (hereinafter sometimes simply referred to as "in front") is satisfied, and when it is determined that the condition is satisfied, decelerating the vehicle 10 by a predetermined degree of deceleration without the driver operating the brake pedal 105". In the first embodiment, the condition is referred to as "deceleration execution condition," and the predetermined degree of deceleration is referred to as "supported degree of deceleration." The supported degree of deceleration is a value having a certain range. Further, in the deceleration support control, the "control of decelerating the vehicle 10 without the driver operating the brake pedal 105 when the deceleration execution condition is satisfied" is referred to as "automatic deceleration control." The deceleration execution condition is an example of the specific condition in the at least one embodiment of the present invention.

(Start of Automatic Deceleration Control)

In the first embodiment, the driving support ECU 21 determines that the deceleration execution condition is satisfied when all of the following first start condition to fourth start condition are satisfied.

First start condition: The vehicle speed (absolute value of the vehicle speed) is higher than a predetermined vehicle speed. The predetermined vehicle speed is hereinafter referred to as "deceleration target vehicle speed."

Second start condition: The distance from the vehicle 10 to the intersection present in front of the vehicle 10 is equal to or less than a threshold value. The threshold value is hereinafter referred to as "first distance threshold value."

Third start condition: A required degree of acceleration, which is described later, is zero.

Fourth start condition: Any one of the right direction indicator 34 and the left direction indicator 35 is operating.

(First Start Condition)

The first start condition is satisfied when the vehicle speed is higher than the deceleration target vehicle speed. The deceleration target vehicle speed is "the target vehicle speed at the time point at which the vehicle 10 has reached the intersection," and is a vehicle speed suitable for the vehicle 10 to turn right or left at the intersection. When the vehicle speed is equal to or less than the deceleration target vehicle speed, the vehicle 10 is not required to decelerate. In view of this, in the first embodiment, one of the deceleration execution conditions is that the vehicle speed exceeds the deceleration target value. The deceleration target vehicle speed is registered in the driving support ECU 21 in advance. For example, 20 km/h can be used as the deceleration target vehicle speed. However, the specific value of the deceleration target vehicle speed is not particularly limited, and can be set as appropriate. The "time point at which the vehicle 10 has reached the intersection" is described later.

(Second Start Condition)

The second start condition is satisfied when the distance from the vehicle 10 to the intersection in front of the vehicle 10 is equal to or less than the first distance threshold value. The first distance threshold value is "the distance required for the vehicle speed to decelerate to the deceleration target vehicle speed when the vehicle 10 is decelerated by the supported degree of deceleration." When the distance from the vehicle 10 to the intersection present in front of the vehicle 10 exceeds the first distance threshold value, the vehicle 10 is not required to decelerate. In view of this, in the first embodiment, one of the deceleration execution conditions is that the distance from the vehicle 10 to the intersection present in front of the vehicle 10 is equal to or less than the first distance threshold value. In the first embodiment, the first distance threshold value is not a fixed value, and is set in accordance with the vehicle speed. The reason for this is that, in order to decelerate the vehicle 10 so that the vehicle speed at the time point at which the vehicle 10 reaches the intersection becomes the deceleration target vehicle speed or less, the distance required for deceleration becomes larger as the vehicle speed becomes higher. Further, the supported degree of deceleration is registered in advance in the driving support ECU 21, and the driving support ECU 21 calculates the first distance threshold value from the vehicle speed detected by the vehicle speed sensor 31 and the supported degree of deceleration registered in advance. When the supported degree of deceleration is a value having a certain range as described above, the driving support ECU 21 uses the minimum value in the range of the supported degree of deceleration to calculate the first distance threshold value.

(Third Start Condition)

The third start condition is satisfied when the required degree of acceleration is zero. The "required degree of acceleration" is the degree of acceleration (including a negative value) of the vehicle 10 determined in accordance with, for example, the operation amounts of the accelerator pedal 104 and the brake pedal 105 by the driver. In a case in which the driver intends to turn the vehicle 10 to the right or left at an intersection in front of the vehicle 10, when the vehicle 10 approaches the intersection, in order to decelerate the vehicle 10 and/or operate the brake pedal 105, the operation amount of the accelerator pedal 104 is reduced to zero. In view of this, in the first embodiment, when the operation amount of the accelerator pedal 104 and the operation amount of the brake pedal 105 are both zero, the required degree of acceleration is considered to be zero. Thus, one of the deceleration execution conditions is that the required degree of acceleration is zero. "The required degree of acceleration is zero" is a state in which the vehicle 10 is traveling (coasting) by inertia without the driving force of the engine 101. In the following description, when the required degree of acceleration is zero or less, the absolute value of the required degree of acceleration may be written as "required degree of deceleration." The required degree of deceleration is the degree of deceleration of the vehicle 10 determined in accordance with, for example, the operation amounts of the accelerator pedal 104 and the brake pedal 105 by the driver. When the required degree of acceleration is zero, the required degree of deceleration is also zero.

When the operation amount of the accelerator pedal 104 is not zero, it can be considered that the driver intends to drive the vehicle 10 by operating the accelerator pedal 104 by himself or herself. Further, when the operation amount of the brake pedal 105 is not zero, it can be considered that the driver intends to decelerate the vehicle 10 by operating the brake pedal 105 by himself or herself. Therefore, in those cases, the driving support ECU 21 gives priority to the intention of the driver (that is, operation of the accelerator pedal 104 and operation of the brake pedal 105 by the driver).

(Fourth Start Condition)

The fourth start condition is satisfied when any one of the right direction indicator 34 and the left direction indicator 35 is operating. When the driver intends to turn the vehicle 10 to the right or left at an intersection, the driver operates the turn signal lever 103 before the vehicle 10 approaches the intersection to cause the direction indicator (any one of the right direction indicator 34 and the left direction indicator 35) indicating the direction in which the vehicle 10 is to turn at the intersection to operate. In view of this, one of the deceleration execution conditions is that any one of the left or right direction indicator 34 or 35 is operating. As the method of determining whether or not the fourth start condition is satisfied, a method using the detection result of the position of the turn signal lever 103 obtained by the turn signal lever sensor 33 can be applied. That is, the driving support ECU 21 determines that the fourth start condition is satisfied when the position of the turn signal lever 103 detected by the turn signal lever sensor 33 is the right ON position or the left ON position.

When the driving support ECU 21 determines that the deceleration execution condition is satisfied, the driving support ECU 21 decelerates the vehicle 10 by the supported degree of deceleration. That is, the driving support ECU 21 starts executing automatic deceleration control. The supported degree of deceleration is "a degree of deceleration that enables the vehicle speed at the time point at which the vehicle 10 has reached the intersection to become the deceleration target vehicle speed." In the first embodiment, "the vehicle 10 has reached the intersection" is the time point at which the distance between the vehicle 10 (more specifically, for example, the front end of the vehicle body of the vehicle 10) and a traffic light in the travel direction of the vehicle 10 becomes equal to or less than a predetermined threshold value. The threshold value is referred to as "second distance threshold value." The second distance threshold value is a distance smaller than the first distance threshold value. Further, when the distance between the vehicle 10 and the traffic light in the travel direction of the vehicle 10 becomes zero, it may be considered that "the vehicle 10 has reached the intersection." When a plurality of traffic lights are installed at one intersection (when a plurality of traffic lights are detected), the driving support ECU 21 determines whether or not the vehicle 10 has reached the intersection based on the traffic light closest to the vehicle 10 (for example, the traffic light installed at the near side of the intersection). When the driving support ECU 21 determines that the deceleration execution condition is satisfied, the driving support ECU 21 transmits to the brake ECU 23 an automatic deceleration control command including a supported degree of deceleration so that the actual degree of deceleration of the vehicle 10 matches the supported degree of deceleration. In other words, the driving support ECU 21 sets the value of the target degree of acceleration of the vehicle 10 to the value of the supported degree of deceleration. When the brake ECU 23 receives the automatic deceleration control command from the driving support ECU 21, the brake ECU 23 drives the brake actuator 41 to decelerate the vehicle 10 so that the degree of acceleration of the vehicle 10 matches the supported degree of deceleration.

In the first embodiment, the driving support ECU 21 uses the distance from the vehicle 10 to the traffic light installed at the intersection as the distance from the vehicle 10 to the intersection present in front of the vehicle 10. With such a configuration, the following effect is obtained. The traffic light is positioned higher than the road surface, and hence the traffic light can be detected (recognized) from further away. In contrast, a stop line, for example, drawn on the road surface cannot be detected (recognized) unless the vehicle is close to the stop line. Accordingly, compared to a configuration in which the search for the intersection present in front of the vehicle 10 is performed by detecting a stop line, for example, drawn on the road surface, with the configuration of the first embodiment, the driving support ECU 21 can detect the intersection at an earlier stage because the search for the intersection present in front of the vehicle 10 is performed by detecting a traffic light. As a result, the first distance threshold value can be set to a longer distance, and the automatic deceleration control can be started at an earlier point in time. Therefore, the supported degree of deceleration can be reduced, and thus sudden deceleration of the vehicle 10 can be prevented or suppressed. Further, the traffic light is positioned higher than the road surface, and hence, compared with a stop line, for example, drawn on the road surface, it is less likely that the traffic light is hidden by another vehicle, for example, and is not detectable. Therefore, the accuracy of determining the deceleration execution condition can be improved.

The driving support ECU 21 performs image recognition processing on a landscape image (image data generated by the front camera 36) in front of the vehicle 10 taken by the front camera 36, to thereby search for traffic lights shown in the image. When a traffic light is shown in the image (in other words, when a traffic light shown in the image is detected), the driving support ECU 21 calculates the distance from the vehicle 10 to the traffic light based on image recognition processing. The driving support ECU 21 may also use the measurement result of the distance obtained by the radar 37 for the distance from the vehicle 10 to the traffic light.

When a plurality of traffic lights are installed at the intersection, for example, when traffic lights are installed at the near side of the intersection and on the far side of the intersection based on the position of the vehicle 10, the distance from the vehicle 10 to the traffic light at the near side of the intersection (that is, the side closer to vehicle 10) is set as the "distance from the vehicle 10 to the intersection present in front of the vehicle 10." In this way, when a plurality of traffic lights are installed at the intersection (when a plurality of traffic lights are detected), the distance from the vehicle 10 to the traffic light closest to vehicle 10 is set as the "distance from the vehicle 10 to the intersection present in front of the vehicle 10."

Further, there are cases in which, after a traffic light is detected (recognized) by the image recognition processing and before the vehicle 10 reaches the position at which the traffic light is present, the traffic light is no longer shown in the image of the landscape in front of the vehicle 10 taken by the front camera 36. For example, when the traffic light is hidden by a roadside tree or when the traffic light is hidden by another vehicle traveling in front of the vehicle 10, the traffic light is temporarily not shown in the image of the landscape in front of the vehicle 10. In this case, the driving support ECU 21 calculates (estimates) the distance from the vehicle 10 to the traffic light. Specifically, when the traffic light is no longer detected (recognized) from the image taken by the front camera 36, the distance from the vehicle 10 to the traffic light at the current time point is calculated based on the distance from the vehicle 10 to the traffic light calculated at the time point of the last detection of the traffic light, the vehicle speed detected by the vehicle speed sensor 31 at the time point of the last detection of the traffic light, and the elapsed time from the time point of the last detection of the traffic light. The driving support ECU 21 then uses the calculation result to determine whether or not the distance from the vehicle 10 to the traffic light at the current time point is equal to or less than the first distance threshold value. When the traffic light is again shown in the image taken by the front camera 36 (when the traffic light is detected), the driving support ECU 21 discards the calculation result of the distance from the vehicle 10 to the traffic light, and calculates the distance from the vehicle 10 to the traffic light based on the image taken by the front camera 36.

(End of Automatic Deceleration Control)

The driving support ECU 21 ends the automatic deceleration control when it is determined that any of the following first end condition to fifth end condition is satisfied during execution of the automatic deceleration control.

First end condition: The vehicle speed is less than or equal to the deceleration target vehicle speed.

Second end condition: The operation of the direction indicator 34 or 35, which has served as the basis for satisfaction of the fourth start condition, has stopped, and then a state in which the direction indicator has stopped operating continues for a predetermined time period.

Third end condition: The operation amount of the accelerator pedal 104 is no longer zero.

Fourth end condition: The operation amount of the brake pedal 105 is no longer zero.

Fifth end condition: The position of the turn signal lever 103 is no longer acquirable.

Each end condition is now described.

(First End Condition)

When the vehicle speed decreases to a deceleration target vehicle speed or lower during execution of the automatic deceleration control, it can be considered that the purpose of the automatic deceleration control has been achieved. Therefore, in this case, the driving support ECU 21 ends the automatic deceleration control.

Figure 2:
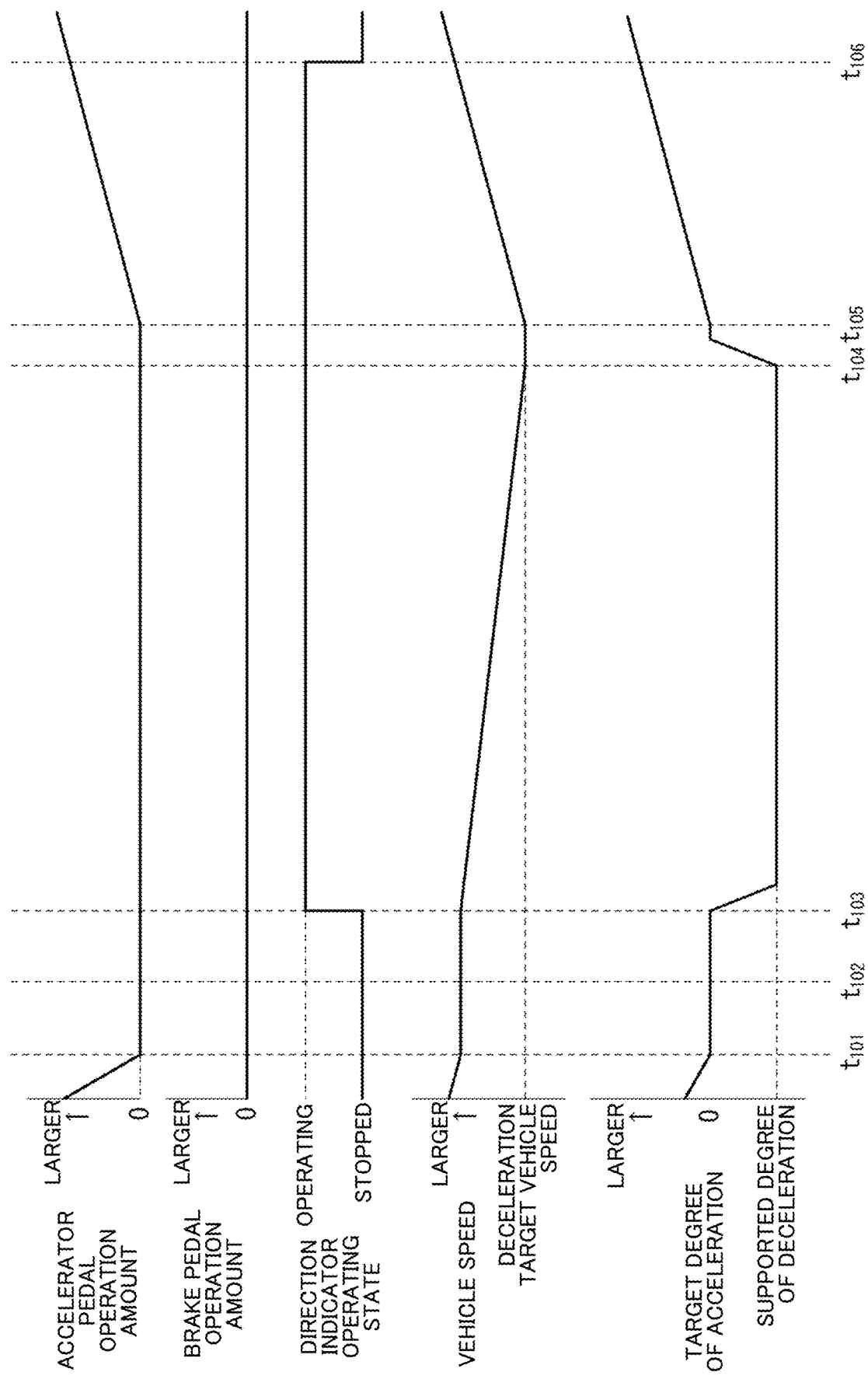
FIG. 2 is a time chart for showing operation of the driving support device.

FIG. 2 is a time chart for showing an example of the operation of the driving support ECU 21. In FIG. 2, an example of ending the automatic deceleration control due to satisfaction of the first end condition is shown. A time point $t_{101}$ of FIG. 2 is a time point at which the operation amount of the accelerator pedal 104 becomes zero. A time point $t_{102}$ is a time point at which the distance from the vehicle 10 to the intersection present in front of the vehicle 10 has reached the first distance threshold value. A time point $t_{103}$ is a time point at which the right direction indicator 34 or the left direction indicator 35 starts operating (can also be referred to as a time point at which the turn signal lever 103 has moved from the OFF position to the right ON position or the left ON position). The vehicle speed at the time point $t_{103}$ is higher than the deceleration target vehicle speed. In this case, at the time point $t_{103}$, all of the first start condition to the fourth start condition are satisfied, and hence the driving support ECU 21 determines that the deceleration execution condition is satisfied at the time point $t_{103}$. Then, the driving support ECU 21 calculates the supported degree of deceleration, and transmits an automatic deceleration control command including the supported degree of deceleration to the brake ECU 23. When the brake ECU 23 receives the automatic deceleration control command from the driving support ECU 21, the brake ECU 23 drives the brake actuator 41 to apply a braking force to the wheels. As a result, the vehicle 10 decelerates at the supported degree of deceleration.

In FIG. 2, there is shown an example in which, while the first start condition is satisfied, the third start condition, the second start condition, and the fourth start condition are satisfied in the stated order. However, the order in which the first to fourth start conditions are satisfied is not limited. When the driving support ECU 21 determines that the first start condition to the fourth start condition are satisfied, the driving support ECU 21 determines that the deceleration execution condition is satisfied regardless of the order of satisfaction.

A time point $t_{104}$ is a time point at which the vehicle speed has reached the deceleration target vehicle speed, and a time point $t_{105}$ is a time point at which the vehicle 10 has reached the intersection. The driving support ECU 21 determines that the first end condition is satisfied at the time point $t_{104}$, and ends the automatic deceleration control. At this time, as shown in FIG. 2, the driving support ECU 21 does not immediately set the target degree of acceleration of the vehicle 10 to zero at the time point $t_{104}$, but gradually brings the target degree of acceleration of the vehicle 10 to closer to zero after the time point $t_{104}$. In other words, the braking force applied by the friction braking mechanism is gradually reduced. A time point $t_{106}$ of FIG. 2 is a time point at which the right direction indicator 34 or the left direction indicator 35 stops operating due to rotation of the steering wheel at the end of the right turn or the left turn of the vehicle 10 at the intersection.

(Second End Condition)

When the operation of the direction indicator 34 or 35, which has served as the basis for satisfaction of the fourth start condition, stops during execution of the automatic deceleration control, it may be considered that the driver does not intend, or has subsequently stopped intending, to turn the vehicle 10 to the right or left. However, there are cases in which the direction indicator 34 or 35 stops operating during execution of the automatic deceleration control even though the driver intends to turn the vehicle 10 to the right or left. For example, a case in which the driver intends to turn the vehicle 10 to the right, moves the turn signal lever 103 to the right ON position, and then moves the vehicle 10 into a right turn lane is assumed. In this case, the driver rotates the steering wheel to the right in order to bring the vehicle 10 into the right turn lane, and then rotates the steering wheel to the left in order to drive the vehicle 10 along the right turn lane. In this case, when the steering wheel is rotated to the left, the turn signal lever 103 may move from the right ON position to the OFF position due to the rotation of the steering wheel. In addition, after the driver moves the turn signal lever 103 from the OFF position to the right ON position, the turn signal lever 103 may return from the right ON position to the OFF position due to the hand, for example, of the driver coming into contact with the turn signal lever 103.

For this reason, immediately ending the automatic deceleration control when the operation of the direction indicator 34 or 35, which has served as the basis for satisfaction of the fourth start condition, stops may lead to a situation in which the automatic deceleration control is ended at a time point not intended by the driver even though the driver intends to turn the vehicle 10 to the right or left (in other words, even though the driver expects the automatic deceleration control to continue). In view of this, in the first embodiment, when the direction indicator 34 or 35 stops operating after the deceleration execution condition is satisfied, the driving support ECU 21 continues the automatic deceleration control until a predetermined time period elapses from the stopping of the operation of the direction indicator 34 or 35, which has served as the basis for satisfaction of the fourth start condition. As a result, it is possible to prevent the automatic deceleration control from being immediately ended when the operation of the direction indicator 34 or 35 is stopped even though the driver intends to turn the vehicle 10 to the right or left. Further, the driving support ECU 21 can wait for an operation of the turn signal lever 103 by the driver for again operating the direction indicator 34 or 35 while the automatic deceleration control is continuing (that is, for the predetermined time period after the operation of the direction indicator 34 or 35 is stopped), and when the direction indicator 34 or 35 starts operating again within the predetermined time period, the driving support ECU 21 continues the automatic deceleration control even after that. As a result, it is possible to prevent or suppress an interruption to the automatic deceleration control that is not intended by the driver. Moreover, the behavior of the vehicle 10 can be stabilized by continuing the automatic deceleration control until the direction indicator 34 or 35 starts operating again within the predetermined time period (that is, until the driver again operates the turn signal lever 103).

Meanwhile, when the operation stoppage of the direction indicator 34 or 35 continues even after the predetermined time period has elapsed from the stopping of the operation of the direction indicator 34 or 35 (when the directions indicator 34 or 35 has not operated), it can be considered the driver does not intend, or has subsequently stopped intending, to turn the vehicle 10 to the right or left. Therefore, in this case, the driving support ECU 21 ends the automatic deceleration control. As a result, continued deceleration of the vehicle 10 can be prevented or suppressed when the driver does not intend to turn the vehicle 10 to the right or left. In this way, during execution of the automatic deceleration control, when the operation of the direction indicator 34 or 35, which has served as the basis for satisfaction of the fourth start condition, stops, and the operation stoppage of the direction indicator 34 or 35 continues (the operation has not restarted) for a predetermined time period from the time point at which the operation stopped, the driving support ECU 21 ends the automatic deceleration control. The predetermined time period is hereinafter referred to as "waiting time."

The length of the waiting time is preferably 0.1 second or more and 3 seconds or less for the following reasons. When chattering occurs during the operation of moving the turn signal lever 103 to the OFF position, the driving support ECU 21 cannot correctly detect the position of the turn signal lever 103 during the period in which chattering is occurring. In view of this, the waiting time is set to be longer than the time required for the chattering to settle. Specifically, the chattering duration is roughly less than 0.1 second, and hence the waiting time is set to 0.1 second or more. Further, when the waiting time is too short, a situation may occur in which the turn signal lever 103 is moved from the right ON position or the left ON position to the OFF position due to an erroneous operation by the driver, and then the automatic deceleration control ends (waiting time elapses) before the driver notices the erroneous operation and operates the turn signal lever 103 again. After the turn signal lever 103 is moved from the right ON position or the left ON position to the OFF position due to an erroneous operation by the driver, it takes from about 1 second to about 2 seconds (2 seconds or less) for the driver to notice the erroneous operation and operate the turn signal lever 103 again. Thus, the waiting time may be 1 second or longer. Meanwhile, when the waiting time is too long, the automatic deceleration control may be continued even though the driver has moved the turn signal lever 103 to the OFF position because the driver does not intend or no longer intends to turn the vehicle 10 to the right or left. Therefore, the waiting time is preferably 3 seconds or less in consideration of a margin of about 1 second in the time (from 1 second to 2 seconds) until the driver notices the erroneous operation and operates the turn signal lever 103 again. However, the length of the waiting time is not limited to the above-mentioned range, and can be set as appropriate.

Figure 3:
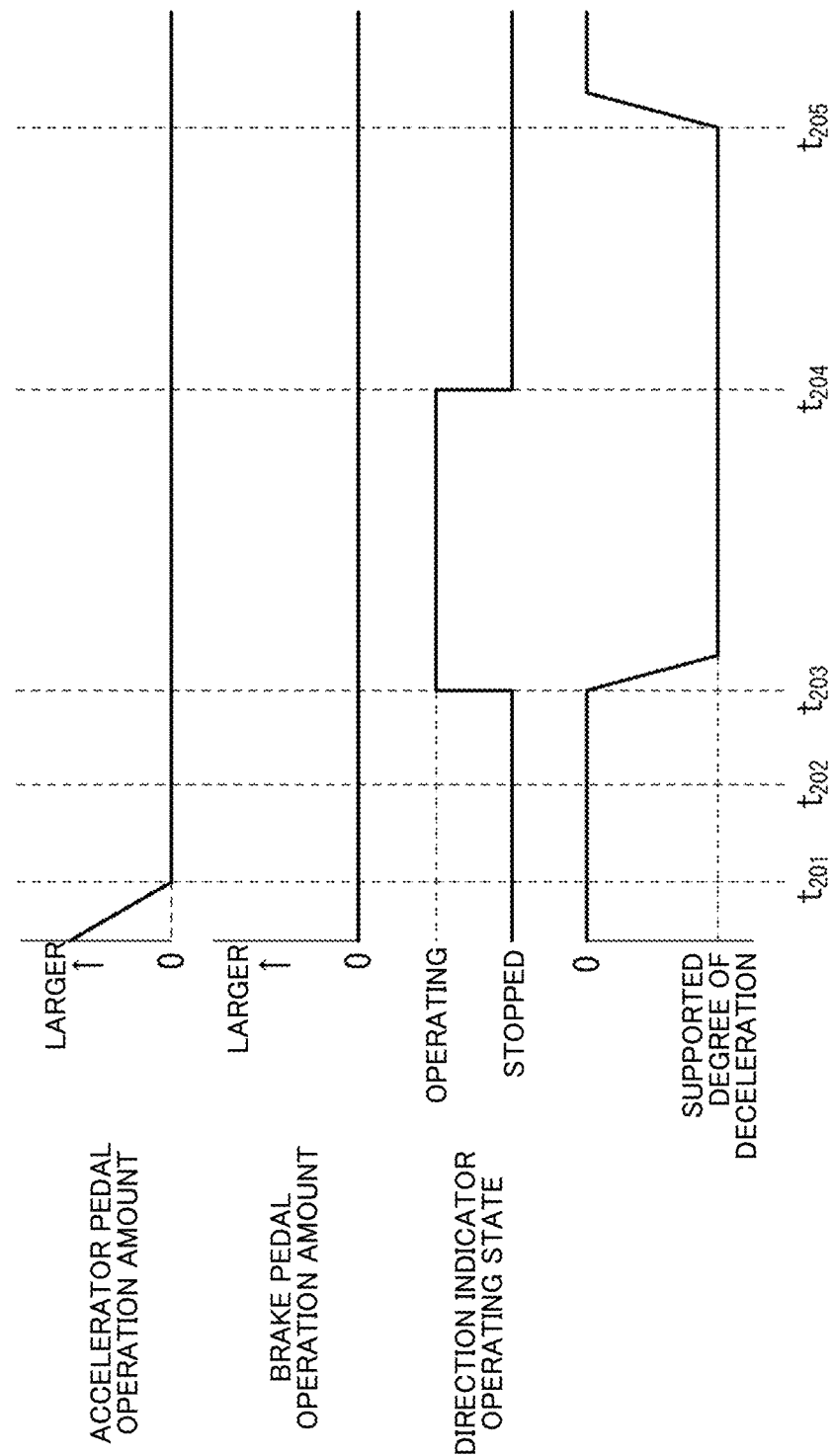
FIG. 3 is a time chart for showing operation of the driving support device.
Figure 4:
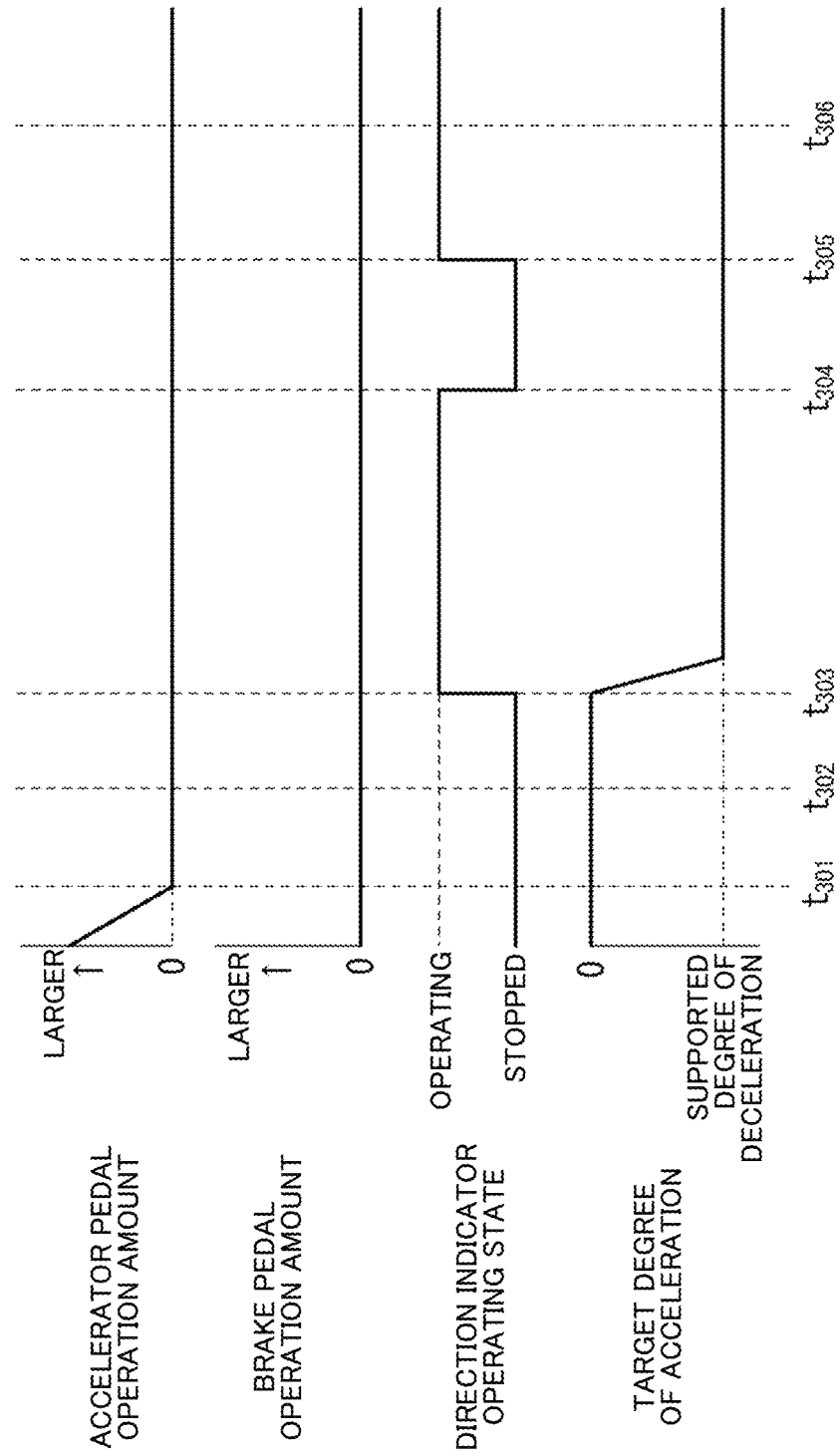
FIG. 4 is a time chart for showing operation of the driving support device.

FIG. 3 and FIG. 4 are time charts for showing an example of the operation of the support device 11a. In FIG. 3 and FIG. 4, an example of the operations performed when the operation of the direction indicator 34 or 35, which has served as the basis for satisfaction of the fourth start condition, stops during execution of the automatic deceleration control is shown. Time points $t_{201}$, $t_{202}$, and $t_{203}$ of FIG. 3 and time points $t_{301}$, $t_{302}$, and $t_{303}$ of FIG. 4 are the same as the $t_{101}$, $t_{102}$, and $t_{103}$ of FIG. 2, respectively. A time point $t_{204}$ and a time point $t_{304}$ are time points at which the operation of the direction indicator 34 or 35, which has served as the basis for satisfaction of the fourth start condition, stops. When the direction indicator 34 or 35 stops operating during execution of the automatic deceleration control, the driving support ECU 21 starts to measure the elapsed time from the time points $t_{204}$ and $t_{304}$ at which the operation stopped. Time points $t_{205}$ and $t_{306}$ are time points at which the waiting time has elapsed from the time points $t_{204}$ and $t_{304}$, respectively. At the time points $t_{205}$ and $t_{306}$, the vehicle 10 has not yet reached the intersection, or the vehicle speed has not decelerated to the deceleration target vehicle speed. That is, the time points $t_{205}$ and $t_{306}$ correspond to time points before the time point $t_{104}$ and the time point $t_{105}$ of FIG. 2.

As shown in FIG. 3, when the stoppage of the operation of the direction indicator 34 or 35 continues from the time point $t_{204}$ at which the direction indicator 34 or 35 stopped operating to the time point $t_{205}$ at which the waiting time has elapsed, the driving support ECU 21 determines that the second end condition is satisfied, and interrupts the automatic deceleration control. At this time, the driving support ECU 21 does not immediately set the target degree of acceleration of the vehicle 10 to zero at the time point $t_{205}$, but gradually brings the target degree of acceleration of the vehicle 10 closer to zero after the time point $t_{205}$.

A time point $t_{305}$ of FIG. 4 is a time point at which the operation of the direction indicator 34 or 35 again starts. The time point $t_{305}$ is a time point before the time point $t_{306}$. For example, the time point $t_{305}$ may correspond to a case in which the turn signal lever 103 is again moved to the right ON position when the turn signal lever 103 has been returned to the OFF position due to the driver rotating the steering wheel to the right in order to bring the vehicle 10 into a right turn lane and then turning the steering wheel to the left to drive the vehicle 10 along the right turn lane. The time point $t_{305}$ is a time point before the time point $t_{306}$, and is the time point at which the second end condition is not satisfied. In this case, the driving support ECU 21 continues to execute the automatic deceleration control. Further, as shown in FIG. 4, the driving support ECU 21 continues the automatic deceleration control even after the time point $t_{306}$. Even at a time point at which the operation of the direction indicator 34 or 35 again stops after the time point $t_{305}$, and the waiting time has elapsed from the time point at which the operation of the direction indicator 34 or 35 again stopped, when the stoppage of the operation of the direction indicator 34 or 35 continues and the automatic deceleration control is being executed, the driving support ECU 21 ends the automatic deceleration control at that time.

(Third End Condition)

When the operation amount of the accelerator pedal 104 is no longer zero, it is considered that the driver intends to drive the vehicle 10 by operating the accelerator pedal 104 by himself or herself (in other words, intends to end deceleration based on automatic deceleration control). In the first embodiment, the driving support ECU 21 gives priority to the intention of the driver over automatic deceleration control. Therefore, in this case, the driving support ECU 21 ends the automatic deceleration control.

Figure 5:
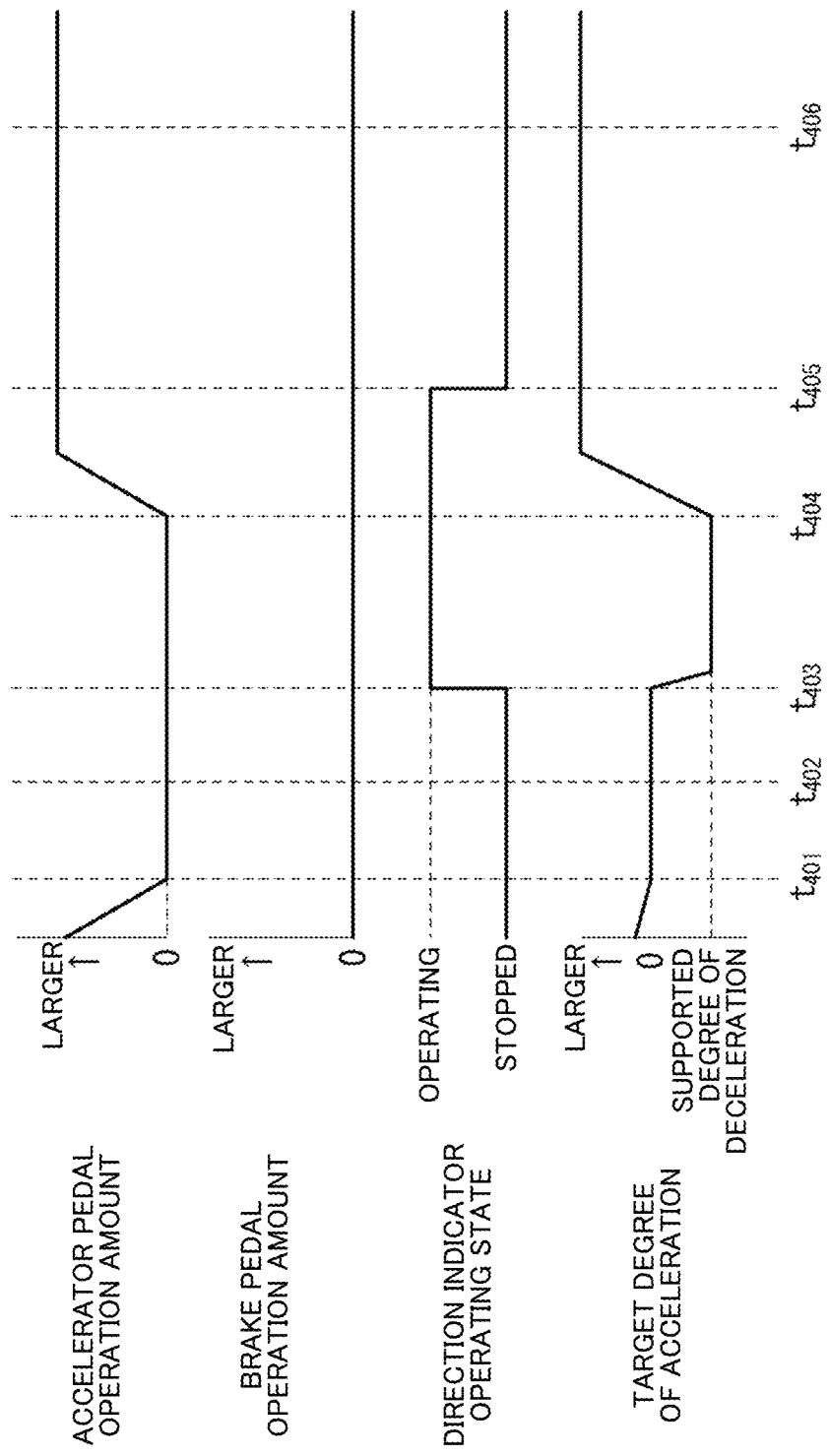
FIG. 5 is a time chart for showing operation of the driving support device.

FIG. 5 is a time chart for showing an example of the operation of the support device 11*a* performed when the accelerator pedal 104 is operated during execution of the automatic deceleration control. Time points $t_{401}$, $t_{402}$, and $t_{403}$ of FIG. 5 are the same as the time points $t_{101}$, $t_{102}$, and $t_{103}$ of FIG. 2, respectively. The driving support ECU 21 starts the automatic deceleration control at the time point $t_{403}$. A time point $t_{404}$ is a time point at which the operation amount of the accelerator pedal 104 is no longer zero. When the operation amount of the accelerator pedal 104 is not zero during execution of the automatic deceleration control, the driving support ECU 21 determines that the third end condition is satisfied, and ends the automatic deceleration control. After that, the driving support ECU 21 sets the target degree of acceleration of the vehicle 10 in accordance with the operation amount of the accelerator pedal 104. A time point $t_{405}$ is a time point at which the operation of the direction indicator 34 or 35, which has served as the basis for satisfaction of the fourth start condition, stops, and a time point $t_{406}$ is a time point at which the waiting time has elapsed from the time point $t_{405}$.

(Fourth End Condition)

When the operation amount of the brake pedal 105 is no longer zero during execution of the automatic deceleration control, it is considered that the driver intends to decelerate the vehicle 10 by operating the brake pedal 105 by himself or herself. Examples of such a case include a case in which the driver intends to stop the vehicle 10 because the traffic light present in front of the vehicle 10 indicates "stop," and a case in which the driver intends to decelerate the vehicle 10 by a degree of deceleration larger than the supported degree of deceleration because the vehicle 10 has approached another vehicle present in front of the vehicle 10. The driving support ECU 21 ends the automatic deceleration control when the operation amount of the brake pedal 105 is no longer zero. Further, when the driving support ECU 21 determines that the fourth end condition is satisfied by detecting the operation of the brake pedal 105 and ends the automatic deceleration control, the driving support ECU 21 then decelerates the vehicle 10 in accordance with the operation amount of the brake pedal 105.

When the automatic deceleration control is immediately ended when the operation amount of the brake pedal 105 is no longer zero during execution of the automatic deceleration control, there is a fear in that the braking force generated by the friction brake mechanism may be temporarily reduced during a period in which the required degree of deceleration (absolute value) is smaller than the supported degree of deceleration (absolute value) (for example, immediately after the driver starts stepping on the brake pedal 105), and as a result, the deceleration of the vehicle 10 may be temporarily reduced. Further, when the automatic deceleration control is ended when the required degree of deceleration based on the operation of the brake pedal 105 is smaller than the supported degree of deceleration, there is a fear in that the vehicle speed at the time when the intersection is reached may not have decelerated to the deceleration target vehicle speed. In view of this, the driving support ECU 21 may determine that the fourth end condition is satisfied when "the operation amount of the brake pedal 105 is no longer zero and the required degree of deceleration has become larger than the supported degree of deceleration."

Figure 6:
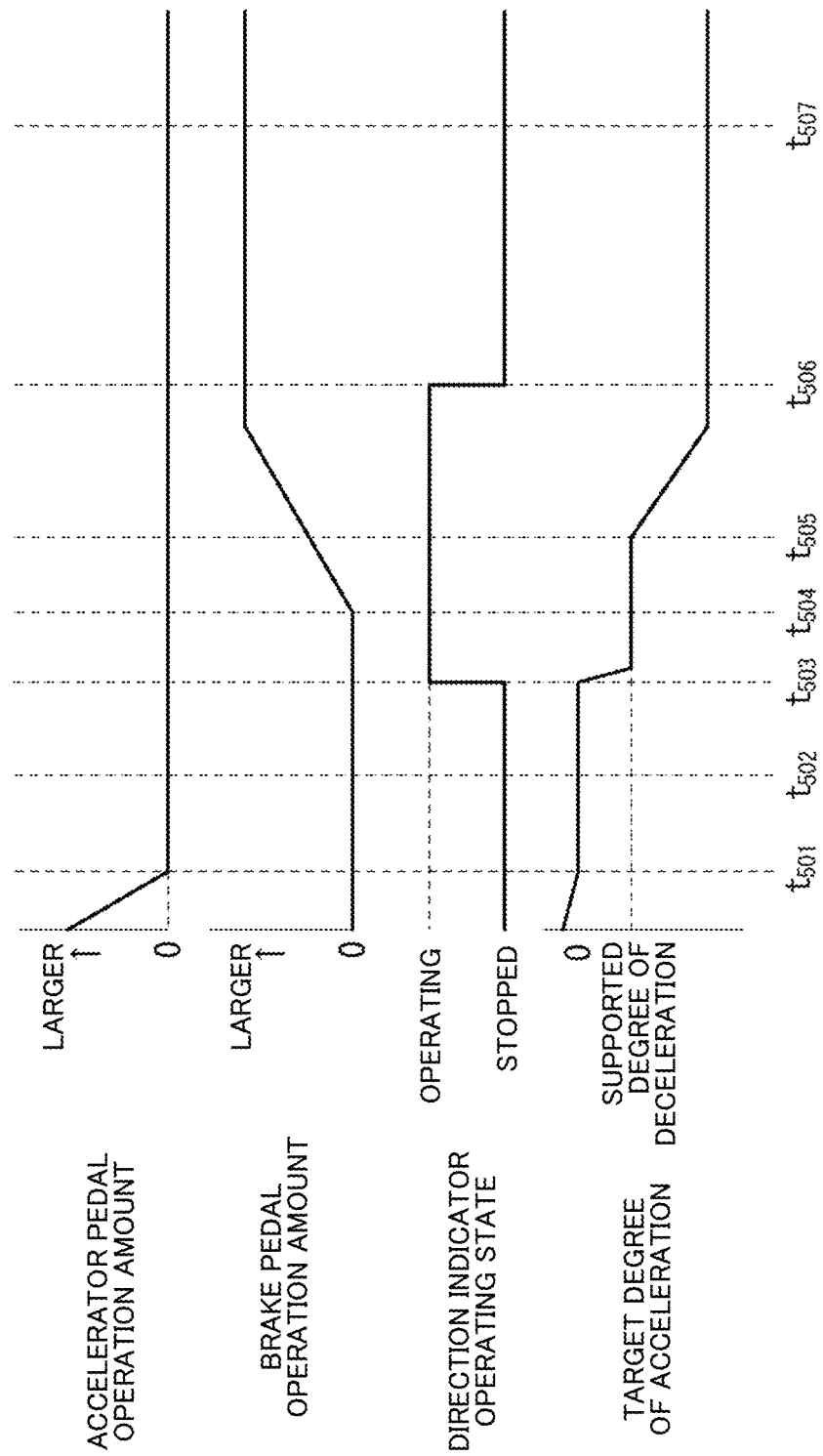
FIG. 6 is a time chart for showing operation of the driving support device.

FIG. 6 is a time chart for showing an example of the operation of the support device 11*a* performed when the brake pedal 105 is operated during execution of the automatic deceleration control. Time points $t_{501}$, $t_{502}$, and $t_{503}$ of FIG. 6 are the same as the time points $t_{101}$, $t_{102}$, and $t_{103}$ of FIG. 2, respectively. The driving support ECU 21 starts the automatic deceleration control at the time point $t_{503}$. A time point $t_{504}$ is a time point at which the operation of the brake pedal 105 is started (time point at which the operation amount of the brake pedal 105 is no longer zero). As shown in FIG. 6, when the brake pedal 105 is operated during execution of the automatic deceleration control, the automatic deceleration control is continued without immediately being stopped. A time point $t_{505}$ is a time point at which the degree of deceleration (that is, the required degree of deceleration by the driver) corresponding to the operation amount of the brake pedal 105 becomes larger than the supported degree of deceleration. The driving support ECU 21 determines that the fourth end condition is satisfied at the time point $t_{505}$, and ends the automatic deceleration control. A time point $t_{506}$ is a time point at which the operation of the direction indicator 34 or 35, which has served as the basis for satisfaction of the fourth start condition, stops, and a time point $t_{507}$ is a time point at which the waiting time has elapsed from the time point $t_{506}$.

(Fifth End Condition)

When the driving support ECU 21 can no longer acquire the position of the turn signal lever 103 during execution of the automatic deceleration control, the driving support ECU 21 can no longer determine whether or not the deceleration execution condition is satisfied. For example, when a wire break occurs, the detection result of the position of the turn signal lever 103 obtained by the turn signal lever sensor 33 may no longer be acquirable by the driving support ECU 21. In this case, from a fail-safe viewpoint, the driving support ECU 21 ends the automatic deceleration control. In this case, unlike the case in which the operation of the direction indicator 34 or 35 has stopped, the automatic deceleration control is ended without waiting for the elapse of the waiting time (that is, is ended when the position of the turn signal lever 103 is no longer acquirable).

Figure 7:
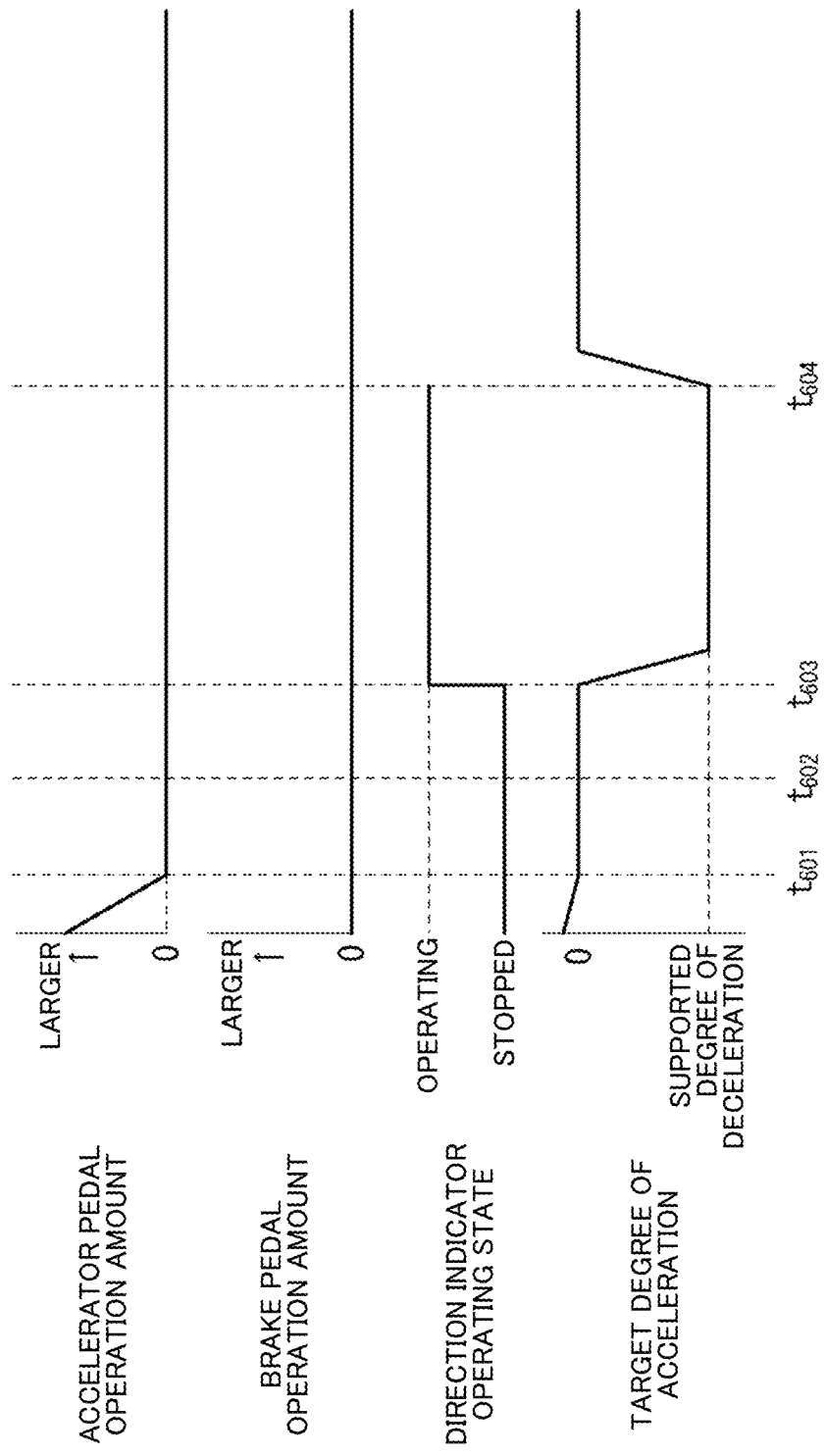
FIG. 7 is a time chart for showing operation of the driving support device.

FIG. 7 is a time chart for showing an example of the operation of the driving support ECU 21 performed when the position of the turn signal lever 103 is no longer acquirable during execution of the automatic deceleration control. Time points $t_{601}$, $t_{602}$, and $t_{603}$ of FIG. 7 are the same as the time points $t_{101}$, $t_{102}$, and $t_{103}$ of FIG. 2, respectively. The driving support ECU 21 starts the automatic deceleration control at the time point $t_{603}$. A time point $t_{604}$ is a time point at which the position of the turn signal lever 103 is no longer acquirable. As shown in FIG. 7, when the driving support ECU 21 can no longer acquire the position of the turn signal lever 103 during execution of the automatic deceleration control, the driving support ECU 21 ends the automatic deceleration control. The driving support ECU 21 does not immediately set the target degree of acceleration of the vehicle 10 to zero at the time point $t_{604}$ at which the position of the turn signal lever 103 is no longer acquirable, but gradually brings the target degree of acceleration of the vehicle 10 closer to zero.

(Processing to be Executed by CPU of Driving Support ECU)

Figure 8:
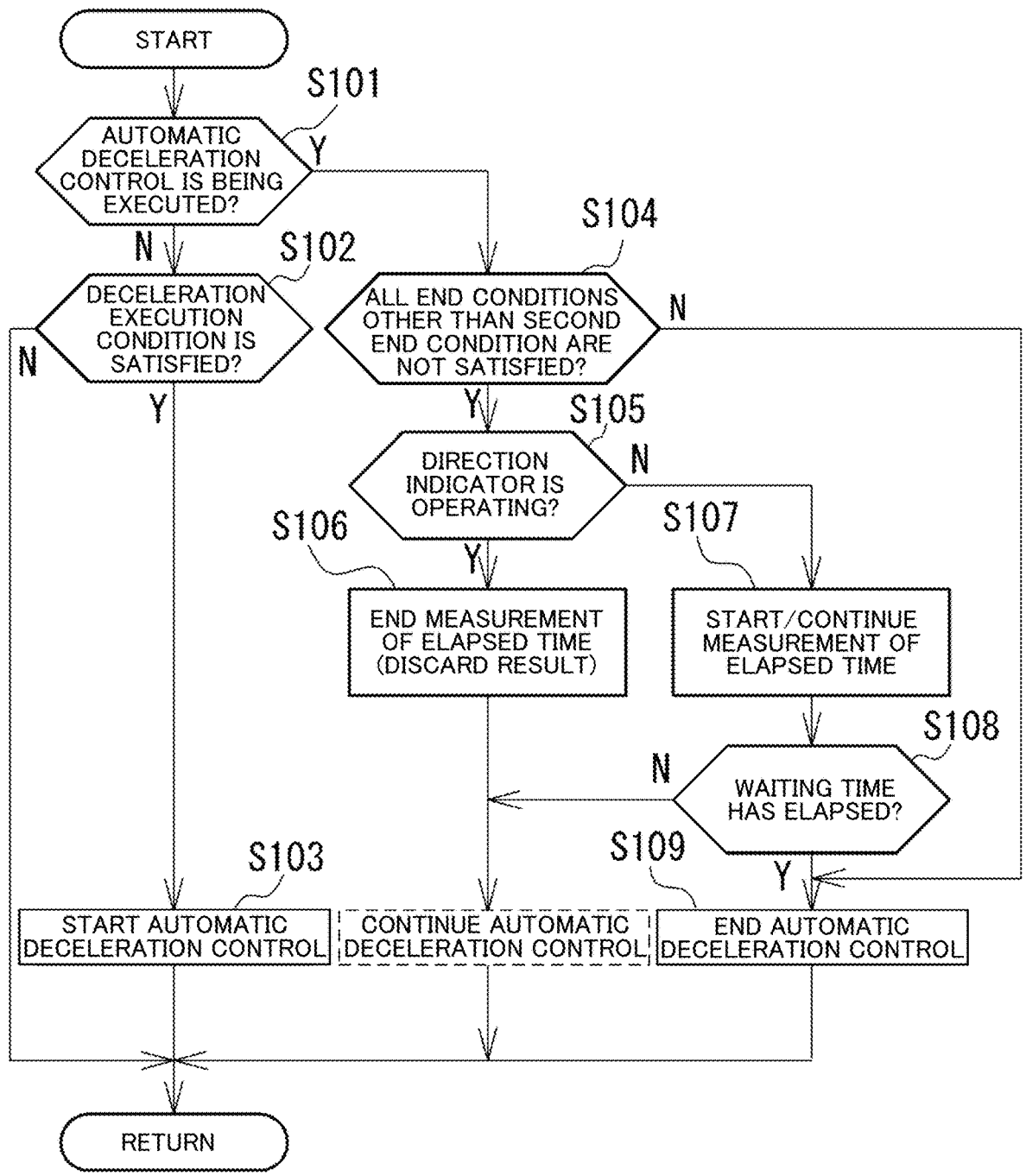
FIG. 8 is a flow chart for illustrating a deceleration support routine.

Next, processing to be executed by the driving support ECU 21 is described with reference to FIG. 8. FIG. 8 is a flow chart for illustrating a deceleration support routine executed by the CPU of the driving support ECU 21. The CPU of the driving support ECU 21 may hereinafter be simply abbreviated as "CPU." The CPU repeatedly executes the deceleration support routine illustrated in FIG. 8 at a predetermined cycle. The deceleration support routine (computer program) is stored in advance in the ROM of the computer of the driving support ECU 21. The CPU reads out the deceleration support routine from the ROM, loads the deceleration support routine onto the RAM, and executes the deceleration support routine.

In Step S101, the CPU determines whether or not the automatic deceleration control is being executed. When the automatic deceleration control is not being executed, the CPU advances the process to Step S102.

In Step S102, the CPU determines whether or not the deceleration execution condition is satisfied. Specifically, the CPU determines that the deceleration execution condition is satisfied when the vehicle speed exceeds the deceleration target vehicle speed (the first start condition is satisfied), the distance from vehicle 10 to the traffic light is equal to or less than the first distance threshold value (the second start condition is satisfied), the operation amounts of the accelerator pedal 104 and the brake pedal 105 are both zero (the third start condition is satisfied), and any one of the left and right direction indicator 34 and 35 is operating (the fourth start condition is satisfied). When the CPU determines that the deceleration execution condition is not satisfied, the CPU temporarily ends this deceleration support routine. Therefore, in this case, the automatic deceleration control is not started.

When the CPU determines in Step S102 that the deceleration execution condition is satisfied, the CPU advances the process to Step S103. In Step S103, the CPU starts the automatic deceleration control. Specifically, an automatic deceleration control command including a supported degree of deceleration is transmitted to the brake ECU 23. Then, the CPU temporarily ends the deceleration support routine. When the brake ECU 23 receives the automatic deceleration control command from the CPU, the brake ECU 23 drives the brake actuator 41 so that the vehicle 10 decelerates at the supported degree of deceleration.

When the CPU determines in Step S101 that the automatic deceleration control is being executed, the CPU advances the process to Step S104. In Step S104, the CPU determines whether or not all of the end conditions other than the second end condition (first end condition, third end condition, fourth end condition, and fifth end condition) are not satisfied, or in other words, determines whether or not anyone of the first end condition, the third end condition, the fourth end condition, and the fifth end condition is satisfied. When the CPU determines that any one (or at least one) of the end conditions other than the second end condition is satisfied, the CPU advances the process to Step S109. In Step S109, the driving support ECU 21 ends the automatic deceleration control.

When the CPU ends the automatic deceleration control due to satisfaction of the first end condition, the fourth end condition, or the fifth end condition, the CPU sets the target degree of acceleration of the vehicle 10 so that the target degree of acceleration of the vehicle 10 gradually approaches zero. When the CPU ends the automatic deceleration control due to satisfaction of the third end condition, the CPU immediately sets the target degree of acceleration of the vehicle 10 to a degree of acceleration in accordance with the operation amount of the accelerator pedal 104. Further, when the CPU detects the operation of the brake pedal 105, the CPU may determine that the fourth end condition is satisfied at the point at which the operation amount of the brake pedal 105 is no longer zero, or may determine that the fourth end condition is satisfied when the required degree of deceleration corresponding to the operation amount of the brake pedal 105 becomes equal to or more than the supported degree of deceleration.

Meanwhile, when it is determined that all of the end conditions other than the second end condition (first end condition, third end condition, fourth end condition, and fifth end condition) are not satisfied, the CPU advances the process to Step S105. In Step S105, the CPU determines whether or not the operation of the direction indicator 34 or 35 is continuing since it is determined in Step S102 that the direction indicator 34 or 35 is operating. When the CPU determines that the operation of the direction indicator 34 or 35 is continuing (the second end condition is not satisfied), the CPU advances the process to Step S106. Meanwhile, when the CPU determines that the operation of the direction indicator 34 or 35 has stopped (the second end condition is satisfied), the CPU advances the process to Step S107.

In Step S106, when measurement of the elapsed time started in Step S107 described later is being executed, the CPU ends (interrupts) the measurement of the elapsed time and discards the measurement result. Further, the CPU temporarily ends the deceleration support routine. In this case, the automatic deceleration control continues without being uninterrupted.

In Step S107, the CPU starts measuring the elapsed time from the time point at which it is determined that the direction indicator 34 or 35 has stopped operating. When measurement of the elapsed time is being executed, the CPU continues the measurement of the elapsed time. Then, the CPU advances the process to Step S108. In Step S108, the CPU determines whether or not the elapsed time from the time point at which it is determined that the direction indicator 34 or 35 has stopped operating has reached the waiting time. When the CPU determines that the elapsed time has not reached the waiting time, the CPU temporarily ends this deceleration support routine. In this case, the automatic deceleration control is continued. Meanwhile, when the CPU determines that the elapsed time has reached the waiting time, the CPU advances the process to Step S109. In Step S109, the CPU ends the automatic deceleration control.

The deceleration support control described above is implemented based on such a deceleration support routine.

Specifically, when the CPU determines that the deceleration execution condition is satisfied while the automatic deceleration control is not being executed ("N" in Step S101 and "Y" in Step S102), the CPU starts the automatic deceleration control (Step S103). Then, when all of the first end condition to the fifth end condition are not satisfied ("Y" in Step S104 and Step S105), the CPU continues the automatic deceleration control. Meanwhile, when the CPU determines that any one of the first end condition, the third end condition, the fourth end condition, and the fifth end condition is satisfied during execution of the automatic deceleration control ("N" in Step S104), the CPU ends the automatic deceleration control (Step S109).

When it is determined that all of the first end condition, the third end condition, the fourth end condition, and the fifth end condition are not satisfied during execution of the automatic deceleration control, and the operation of the direction indicator 34 or 35 is stopped ("Y" in Step S104 and "N" in Step S105), the CPU starts measuring the elapsed time from the time point at which the direction indicator 34 or 35 has stopped operating (Step S107). Then, when the operation of the direction indicator 34 or 35 remains stopped at the time point at which the waiting time has elapsed since the direction indicator 34 or 35 stopped operating ("N" in Step S105 and "Y" in Step S108), the CPU determines that the second end condition is satisfied, and ends the automatic deceleration control (Step S109). Meanwhile, when it is determined that the direction indicator 34 or 35 is operating at a time point before the waiting time has elapsed since the direction indicator 34 or 35 stopped operating (in other words, operation of the direction indicator 34 or 35 has restarted) ("Y" in Step S105), the CPU continues the automatic deceleration control without ending the automatic deceleration control. However, when it is determined any one of first end condition, the third end condition, the fourth end condition, and the fifth end condition is satisfied at a time point before the waiting time has elapsed from the time at which the direction indicator 34 or 35 stopped operating ("N" in Step S104), the CPU ends the automatic deceleration control. As used herein, "when it is determined that the direction indicator 34 or 35 is operating at a time point before the waiting time has elapsed since the direction indicator 34 or 35 stopped operating" can be read as "the deceleration execution condition is again satisfied at a time point before the waiting time has elapsed from satisfaction of the second end condition (since the deceleration execution condition was no longer satisfied)."

Second Embodiment

Next, a second embodiment of the present invention is described. In the second embodiment, the subsequent operations differ from each other depending on whether satisfaction of the second end condition is based on the operation of the turn signal lever 103, or based on rotation of the steering wheel.

Figure 9:
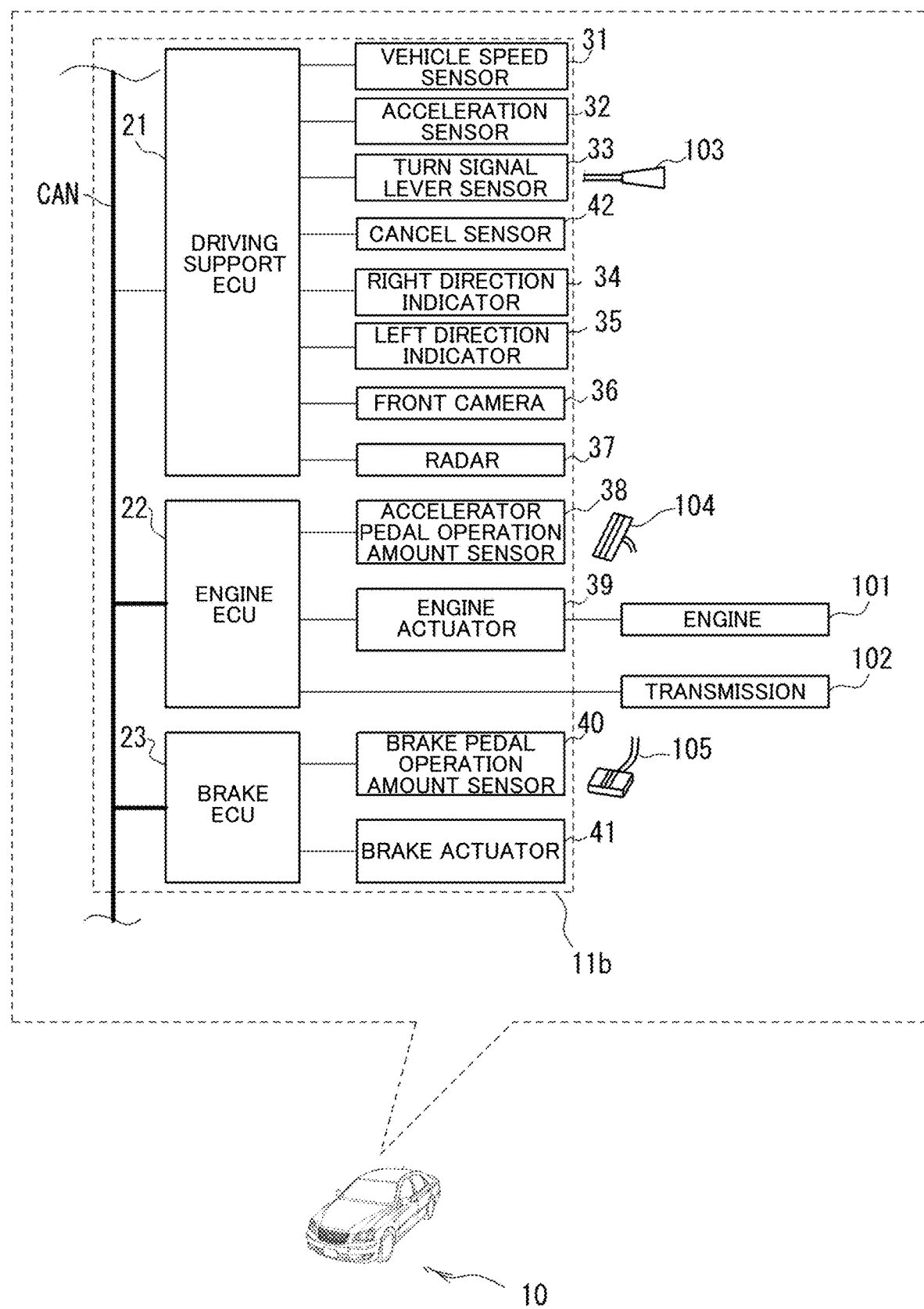
FIG. 9 is a diagram for illustrating a vehicle and a driving support device for a vehicle according to a second embodiment of the present invention.

FIG. 9 is a diagram for illustrating a configuration of a support device 11b. Description of parts that are the same as those in the first embodiment is omitted. As illustrated in FIG. 9, the support device 11b includes a cancel sensor 42. The cancel sensor 42 can detect, when the turn signal lever 103 moves from the right ON position or left ON position to the OFF position, whether or not the movement is due to rotation of the steering wheel. For example, the shaft of the steering wheel includes an engaging portion (for example, a hook-shaped portion) that can engage with the turn signal lever 103 positioned at each of the right ON position and the left ON position. When the steering wheel rotates to the left when the turn signal lever 103 is positioned at the right ON position, the engaging portion engages with the turn signal lever 103 and pushes the turn signal lever 103 toward the OFF position. Similarly, when the steering wheel rotates to the right when the turn signal lever 103 is positioned at the left ON position, the engaging portion engages with the turn signal lever 103 and pushes the turn signal lever 103 toward the OFF position. Thus, the turn signal lever 103 is moved to the OFF position by the rotation of the steering wheel. The cancel sensor 42 is arranged at a position at which the engaging portion of the shaft of the steering wheel on the turn signal lever 103 can engage. The cancel sensor 42 is configured to switch between ON and OFF (for example, switch from OFF to ON) based on the engagement of the engaging portion of the shaft due to rotation of the steering wheel.

When it is detected that the cancel sensor 42 has switched between ON and OFF when the turn signal lever sensor 33 detects that the turn signal lever 103 has moved from the right ON position or the left ON position to the OFF position, the driving support ECU 21 determines that the movement of the turn signal lever 103 is due to rotation of the steering wheel. Meanwhile, when it is not detected that the cancel sensor 42 has switched between ON and OFF, the driving support ECU 21 determines that the movement of the turn signal lever 103 is due to an operation of the turn signal lever 103 by the driver. In this way, the driving support ECU 21 is configured to be capable of determining, when the direction indicator 34 or 35 has stopped operating (when the turn signal lever 103 has moved from the right ON position or the left ON position to the OFF position), whether the direction indicator 34 or 35 has stopped operating due to rotation of the steering wheel or due to operation of the turn signal lever 103.

(Deceleration Support Control)

When the operation of the direction indicator 34 or 35, which has served as the basis for satisfaction of the fourth start condition, stops during execution of the automatic deceleration control, the driving support ECU 21 sets the length of the waiting time to be different depending on whether the operation stoppage is due to rotation of the steering wheel or due to operation of the turn signal lever 103. Specifically, the driving support ECU 21 sets the waiting time to a first time period when the direction indicator 34 or 35 has stopped operating due to operation of the turn signal lever 103, and sets the waiting time to a second time period when the direction indicator 34 or 35 has stopped operating due to rotation of the steering wheel. The first time period and the second time period have lengths different from each other, and the first time period is shorter than the second time period. For the second time period, for example, the same length as that of the waiting time in the first embodiment is applied. In a case in which the direction indicator 34 or 35 has stopped operating due to operation of the turn signal lever 103, when the operation stoppage of the direction indicator 34 or 35 continues until the first time period elapses after the stoppage of the direction indicator 34 or 35, the driving support ECU 21 determines that the second end condition is satisfied, and ends the automatic deceleration control. Meanwhile, in a case in which the direction indicator 34 or 35 has stopped operating due to rotation of the steering wheel, when the operation stoppage of the direction indicator 34 or 35 continues until the second time period elapses after the stoppage of the direction indicator 34 or 35, the driving support ECU 21 determines that the second end condition is satisfied, and ends the automatic deceleration control.

With the control described above, the behavior of the vehicle 10 can be brought closer to the intention of the driver. That is, when the direction indicator 34 or 35 has stopped operating due to operation of the turn signal lever 103, it can be considered that there is a higher likelihood that the driver does not intend to turn the vehicle 10 to the right or left as compared with when the direction indicator 34 or 35 has stopped operating due to rotation of the steering wheel. Meanwhile, even when the direction indicator 34 or 35 has stopped operating due to operation of the turn signal lever 103, there is still a possibility that the direction indicator 34 or 35 has stopped operating due to the turn signal lever 103 having moved against the intention of the driver (for example, as a result of coming into contact with the hand of the driver). However, in this case, the driver is likely to immediately again operate the turn signal lever 103 to again operate the direction indicator 34 or 35. In the second embodiment, when the direction indicator 34 or 35 has stopped operating due to operation of the turn signal lever 103, the driving support ECU 21 does not immediately end the automatic deceleration control, but continues the automatic deceleration control for the first time period. That is, when the direction indicator 34 or 35 has stopped operating due to operation of the turn signal lever 103, it is considered that the operation may be an operation that is not intended by the driver, and the automatic deceleration control is continued until the turn signal lever 103 is again operated. As a result, it is possible to prevent or suppress an interruption to the automatic deceleration control that is not intended by the driver. Further, by setting the duration of this automatic deceleration control to be relatively short, specifically, by setting the duration to be shorter than when the direction indicator 34 or 35 has stopped operating due to rotation of the steering wheel, the automatic deceleration control can be quickly ended when the driver does not intend to turn the vehicle 10 to the right or left.

Figure 10:
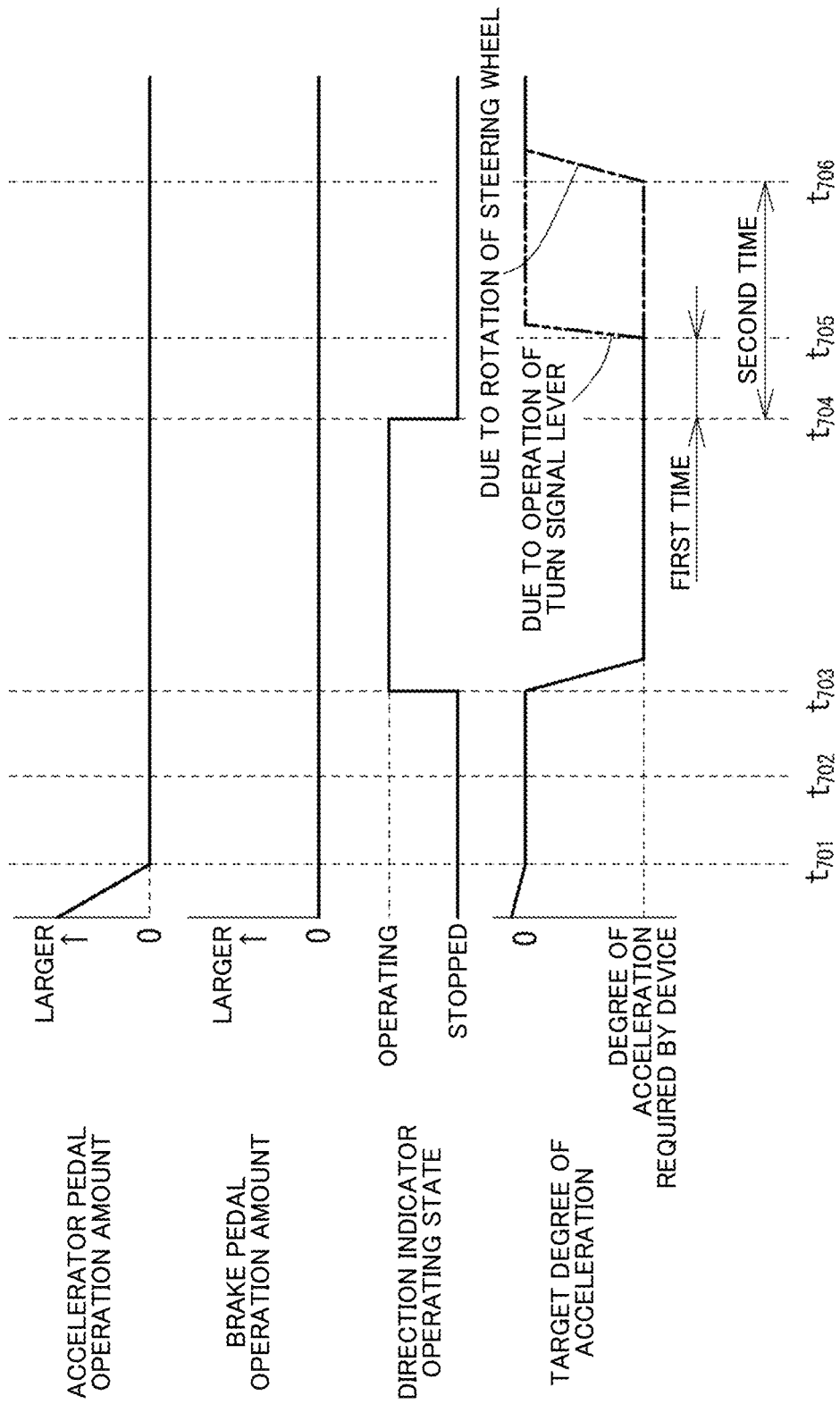
FIG. 10 is a time chart for showing operation of the driving support device.

FIG. 10 is a time chart for showing the operation of the support device 11b according to the second embodiment. Time points $t_{701}$, $t_{702}$, and $t_{703}$ of FIG. 10 are the same as the time points $t_{101}$, $t_{102}$, and $t_{103}$ of FIG. 2, respectively. A time point $t_{704}$ of FIG. 10 is a time point at which the operation of the direction indicator 34 or 35 has stopped, which is the same as the time point $t_{204}$ of FIG. 3. When the direction indicator 34 or 35 has stopped operating during execution of the automatic deceleration control, the driving support ECU 21 determines whether the direction indicator 34 or 35 has stopped operating due to operation of the turn signal lever 103 or due to rotation of the steering wheel. At the same time, the driving support ECU 21 starts measuring the elapsed time from the time point $t_{704}$ at which the direction indicator 34 or 35 has stopped operating.

Further, when the direction indicator 34 or 35 has stopped operating due to rotation of the steering wheel, and the operation stoppage of the direction indicator 34 or 35 has continued at a time point $t_{706}$ at which the second time period has elapsed from the time point $t_{704}$ at which the operation stopped, the driving support ECU 21 determines that the second end condition is satisfied and ends the automatic deceleration control. Meanwhile, when the direction indicator 34 or 35 has stopped operating due to operation of the turn signal lever 103, and the operation stoppage of the direction indicator 34 or 35 has continued at a time point $t_{705}$ at which the first time period having a predetermined length has elapsed from the time point $t_{704}$ at which the operation stopped, the driving support ECU 21 determines that the second end condition is satisfied, and ends the automatic deceleration control. As shown in FIG. 10, when the driving support ECU 21 determines that the second end condition is satisfied, the driving support ECU 21 gradually brings the target degree of acceleration of the vehicle 10 closer to zero. At this time, when satisfaction of the second end condition is due to operation of the turn signal lever 103, the rate of change in the target degree of acceleration of vehicle 10 may be set higher than when satisfaction of the second end condition is due to rotation of the steering wheel. In other words, when satisfaction of the second end condition is due to operation of the turn signal lever 103, the driving support ECU 21 may set the target degree of acceleration of the vehicle 10 to zero in a shorter time than when satisfaction of the second end condition is due to rotation of the steering wheel.

(Processing to be Executed by CPU of Driving Support ECU)

Figure 11:
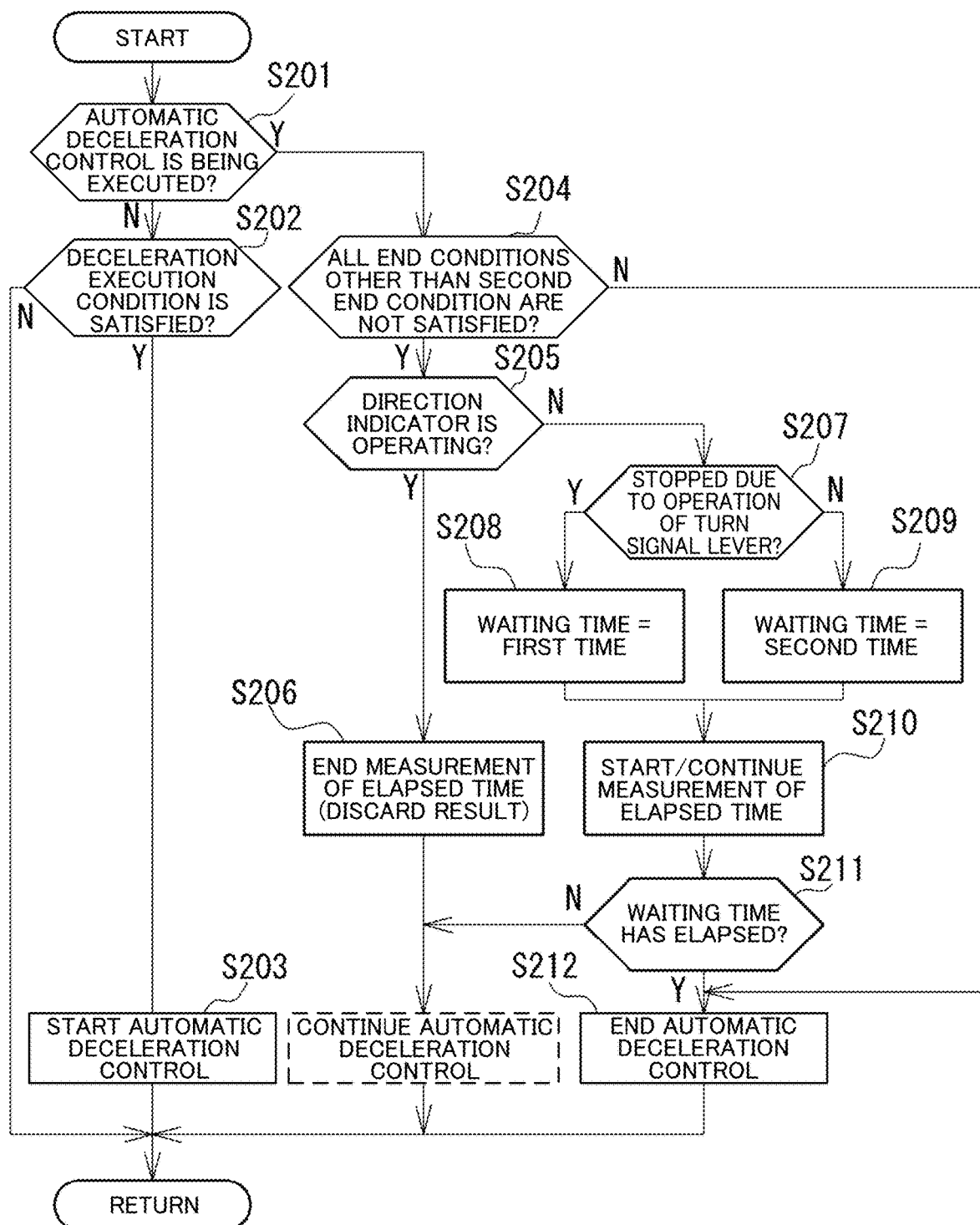
FIG. 11 is a flow chart for illustrating a deceleration support routine.

Next, processing to be executed by the CPU of the driving support ECU 21 is described with reference to FIG. 11. FIG. 11 is a flow chart for illustrating a deceleration support routine executed by the CPU of the driving support ECU 21. The CPU repeatedly executes the deceleration support routine illustrated in FIG. 11 at a predetermined cycle. Step S201 to Step S206 and Step S210 to Step S212 of FIG. 11 have the same contents as those of Step S101 to Step S109 of FIG. 2, respectively. Therefore, description of those steps is omitted here.

When the CPU determines in Step S205 that the direction indicator 34 or 35 has stopped operating, the CPU advances the process to Step S207. In Step S207, the CPU determines whether the direction indicator 34 or 35 has stopped operating due to rotation of the steering wheel or due to operation of the turn signal lever 103. When the direction indicator 34 or 35 has stopped operating due to operation of the turn signal lever 103, the CPU advances the process to Step S208. In Step S208, the CPU sets the length of the waiting time to the first time period. Then, the CPU advances the process to Step S210. Meanwhile, when the CPU determines in Step S207 that the direction indicator 34 or 35 has stopped operating due to rotation of the steering wheel, the CPU advances the process to Step S209. In Step S209, the CPU sets the length of the waiting time to the second time period, which is longer than the first time period. Then, the CPU advances the process to Step S210.

The deceleration support control described above is implemented based on such a deceleration support routine.

The embodiments of the present invention have been described above, but the technical scope of the present invention is not limited to the above-mentioned embodiments. Various modifications can be made to the present invention without departing from the gist of the present invention, and the technical scope of the present invention also encompasses those modifications.

For example, in the embodiments described above, control using a traffic light as a marker indicating the presence and position of an intersection is described, but the marker indicating the presence and position of the intersection is not limited to a traffic light. For example, a road sign may be used as a marker indicating the presence and position of the intersection.

The configuration of the turn signal lever 103 is not limited to the configuration described above. For example, the turn signal lever 103 may be configured to be constantly urged toward the OFF position by a spring or the like. In this case, when the driver moves the turn signal lever 103 from the OFF position to the right ON position in order to operate the right direction indicator 34, and then the driver releases the turn signal lever 103, the turn signal lever 103 moves to the OFF position. Further, the driving support ECU 21 continues to operate the right direction indicator 34 until the steering wheel rotates to the left or the driver moves the turn signal lever 103 to a predetermined cancel position (for example, the left ON position). The same applies to the operation of the left direction indicator 35. In this case, the driving support ECU 21 monitors an operating current of the right direction indicator 34 and an operating current of the left direction indicator 35 to determine whether or not each of the right direction indicator 34 and the left direction indicator 35 is operating.

In the embodiments described above, a configuration in which the driving support ECU 21 executes the deceleration support routine is described, but a device other than the driving support ECU 21 may execute the deceleration support routine. Further, the support devices 11a and 11b may each include another ECU other than the driving support ECU 21, the engine ECU 22, and the brake ECU 23, and the another ECU may execute the deceleration support routine. Moreover, a plurality of devices may cooperate to execute the deceleration support routine. As described above, the device which executes the deceleration support routine is not limited.

In each of the embodiments described above, a vehicle including an engine (internal combustion engine) as a driving force source is described, but the driving force source is not limited to an engine. The present invention can also be applied to a vehicle (electric vehicle) including a motor (electric motor) as a driving force source, and a vehicle (hybrid vehicle) including an engine and a motor as a driving force source.

Further, the first distance threshold value may be a fixed value.

What is claimed is:

1. A driving support device for a vehicle, the driving support device comprising a control device configured to:

execute automatic deceleration control for decelerating the vehicle when a specific condition indicating that a driver of the vehicle intends to turn the vehicle to right or left at an intersection present in front of the vehicle is satisfied, the specific condition including operation of a direction indicator for indicating a travel direction of the vehicle as a condition of satisfaction;

continue, when the direction indicator stops operating during execution of the automatic deceleration control, the automatic deceleration control for a predetermined time period from a time point at which the direction indicator stops operating; and end the automatic deceleration control when the direction indicator continues to stop operating from the time point at which the direction indicator stops operating until the predetermined time period elapses, wherein the control device is configured to determine that the specific condition is satisfied when a distance from the vehicle to the intersection present in front of the vehicle is equal to or less than a predetermined distance, a required degree of acceleration is zero, and the direction indicator is operating;

the driving support device further comprising:

a front camera configured to photograph a landscape in front of the vehicle; and a vehicle speed sensor configured to detect a speed of the vehicle, wherein the control device is further configured to:

search for a traffic light present in front of the vehicle by performing image processing on an image taken by the front camera, and calculate a distance from the vehicle to the traffic light when the traffic light is detected by the search;

set the calculated distance from the vehicle to the traffic light as a distance from the vehicle to the intersection present in front of the vehicle at the current time point wherein, when the traffic light is no longer detected from the image taken by the front camera, calculate a distance from the vehicle to the traffic light at a current time point based on a distance from the vehicle to the traffic light calculated at a time point of last detection of the traffic light, a speed of the vehicle at the time point of the last detection of the traffic light, and an elapsed time from the time point of the last detection of the traffic light, and set the calculated distance from the vehicle to the traffic light as a distance from the vehicle to the intersection present in front of the vehicle at the current time point.

2. A driving support device for a vehicle, the driving support device comprising a control device configured to:

execute automatic deceleration control for decelerating the vehicle when a specific condition indicating that a driver of the vehicle intends to turn the vehicle to right or left at an intersection present in front of the vehicle is satisfied, the specific condition including operation of a direction indicator for indicating a travel direction of the vehicle as a condition of satisfaction;

continue, when the direction indicator stops operating during execution of the automatic deceleration control, the automatic deceleration control for a predetermined time period from a time point at which the direction indicator stops operating; and end the automatic deceleration control when the direction indicator continues to stop operating from the time point at which the direction indicator stops operatng until the predetermined time period elapses wherein the vehicle includes:

a turn signal lever operatively configured to switch between a state in which the direction indicator is operating and a state in which the operation of the direction indicator is stopped in accordance with a position of the turn signal lever; and a steering wheel configured to stop the operation of the direction indicator when the steering wheel rotates in a direction opposite to the travel direction of the vehicle indicated by the direction indicator during the operation, and wherein the control device is configured to set the predetermined time period to be shorter when the direction indicator has stopped operating due to operation of the turn signal lever during execution of the automatic deceleration control as compared with when the direction indicator has stopped operating due to the rotation of the steering wheel.

3. The driving support device for a vehicle according to claim 2, wherein the control device is configured to end the automatic deceleration control when the position of the turn signal lever is no longer detected during execution of the automatic deceleration control.

* * * * *